(12) United States Patent
Suzuka

(10) Patent No.: US 9,985,666 B2
(45) Date of Patent: May 29, 2018

(54) TRANSMISSION DEVICE, RECEPTION DEVICE, BROADCAST SIGNAL PROCESSING METHOD, AND BROADCAST RECEIVER

(71) Applicant: Funai Electric Co., Ltd., Daito, Osaka (JP)

(72) Inventor: Takuya Suzuka, Kyoto (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days. days.

(21) Appl. No.: 15/622,200

(22) Filed: Jun. 14, 2017

(65) Prior Publication Data

US 2017/0373707 A1  Dec. 28, 2017

(30) Foreign Application Priority Data

Jun. 27, 2016 (JP) ................................ 2016-126856

(51) Int. Cl.
*H04B 1/04* (2006.01)

(52) U.S. Cl.
CPC ..................................... *H04B 1/04* (2013.01)

(58) Field of Classification Search
CPC ...................................................... H04B 1/04
See application file for complete search history.

(56) References Cited

U.S. PATENT DOCUMENTS

| | | | | |
|---|---|---|---|---|
| 5,483,663 A * | 1/1996 | Tawil | ..................... | H04H 40/90 348/E7.093 |
| 6,118,976 A * | 9/2000 | Arias | ..................... | H04N 7/173 348/E7.069 |
| 6,504,863 B1 * | 1/2003 | Hellmark | ............... | H03M 1/129 341/139 |
| 2004/0092228 A1 * | 5/2004 | Force | ................. | H04B 7/18523 455/19 |
| 2005/0172320 A1 * | 8/2005 | Katayama | ............ | H04N 5/4401 725/70 |
| 2008/0298519 A1 * | 12/2008 | Tsutsui | ..................... | H01Q 3/30 375/345 |

FOREIGN PATENT DOCUMENTS

| | | |
|---|---|---|
| JP | 3812599 B | 8/2006 |
| JP | 4800588 B | 10/2011 |

OTHER PUBLICATIONS

Extended European Search Report of the corresponding European Application No. 17176850.0, dated Nov. 16, 2017.

\* cited by examiner

*Primary Examiner* — Kenneth Lam
(74) *Attorney, Agent, or Firm* — Global IP Counselors, LLP

(57) ABSTRACT

A transmission device includes a first converter, a second converter, a generation component, and a transmitter. The first converter converts a first analog signal, which is a broadcast signal of a specific polarity, into a first digital signal. The second converter converts a second analog signal, which is a broadcast signal whose polarity is different from the specific polarity, into a second digital signal. The generation component generates a third digital signal that includes information of the first and second digital signals. The transmitter transmits the third digital signal generated by the generation component.

16 Claims, 14 Drawing Sheets

| RESOLUTION [NUMBER OF BITS] | 1 | 2 | 3 | 4 | 5 | 6 | 7 |
|---|---|---|---|---|---|---|---|
| SNR OF A/D CONVERSION [DB] | 7.78 | 13.80 | 19.82 | 25.84 | 31.86 | 37.88 | 43.90 |

FIG. 2

TRANSMISSION DEVICE, RECEPTION DEVICE, BROADCAST SIGNAL PROCESSING METHOD, AND BROADCAST RECEIVER

CROSS-REFERENCE TO RELATED APPLICATIONS

This application claims priority to Japanese Patent Application No. 2016-126856 filed on Jun. 27, 2016. The entire disclosure of Japanese Patent Application No. 2016-126856 is hereby incorporated herein by reference.

BACKGROUND

Field of the Invention

The present invention generally relates to a transmission device, a reception device, a broadcast signal processing method, and a broadcast receiver.

Background Information

In an attempt to utilize radio waves more efficiently, polarization division multiplexing, in which a plurality of broadcast waves of different polarization with overlapping frequency bands are multiplexed and transmitted, has been studied in satellite broadcast systems, for example. A broadcast wave that has undergone polarization division multiplexing is separated by a receiving antenna into broadcast signals by polarization before being outputted.

Since the frequency bands are overlapped in the separated broadcast signals, different signal cables are used, for example, for distribution to a broadcast receiver. In another known technique, a single signal cable is used for distribution by subjecting separated broadcast signals to frequency conversion and frequency division multiplexing (Japanese Patent No. 3,812,599 (Patent Literature 1) and Japanese Patent No. 4,800,588 (Patent Literature 2), for example).

SUMMARY

However, the following problems have been discovered with prior art.

When a plurality of different signal cables are used for broadcast signals, this drives up the cost for signal cable materials and their installation labor. Furthermore, the plurality of signal cables also take up more space when installed.

The use of polarization division multiplexing complicates system design because of the need for dealing with image signals that are generated during frequency conversion or mixing and the need to avoid interference. Also, signals that have undergone frequency division multiplexing have a wide band. Thus, the signals are susceptible to interfering waves that come from the outside (hereinafter also referred to as disturbance). Therefore, it is conceivable that further study will have to be devoted to eliminating this disturbance.

One object of the present disclosure is to provide a transmission device, a broadcast signal processing method, and a reception device and a broadcast receiver that are applied to the transmission device, with which analog signals that are a plurality of broadcast signals having different polarity and having undergone polarization division multiplexing, for example, can be simply distributed using a single signal cable.

In view of the state of the know technology and in accordance with a first aspect, a transmission device comprises a first converter, a second converter, a generation component, and a transmitter. The first converter converts a first analog signal, which is a broadcast signal of a specific polarity, into a first digital signal. The second converter converts a second analog signal, which is a broadcast signal whose polarity is different from the specific polarity, into a second digital signal. The generation component generates a third digital signal that includes information of the first and second digital signals. The transmitter transmits the third digital signal generated by the generation component.

BRIEF DESCRIPTION OF THE DRAWINGS

Referring now to the attached drawings which form a part of this original disclosure:

FIG. 2 is a table showing an example of the relation between quantization noise and the resolution of A/D conversion;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. The numerical values, shapes, materials, constituent elements, layout positions and connection modes of the constituent elements, and so forth given in the following embodiments are all just examples, and are not intended to limit the present invention. Of the constituent elements in the following embodiments, those not mentioned in an independent claim will be described as optional constituent elements. The drawings do not necessarily depict the various dimensions, dimensional ratios, and so forth strictly accurately.

First Embodiment

A broadcast signal processing device 100 in accordance with a first embodiment will be described referring through FIGS. 1 to 4B. The broadcast signal processing device 100 is a device that performs signal processing for using a single signal cable to distribute a plurality of broadcast signals that have been separated by a compatible antenna from a broadcast wave that has undergone polarization division multiplexing. The broadcast signal processing device 100 is configured such that a plurality of broadcast signals of the same frequency band but different polarization are multiplexed in digital data format, and transmitted from a receiving antenna to a broadcast receiver. Here, the broadcast signals with different polarization are an example of a plurality of analog signals of different polarity.

Figure 1:
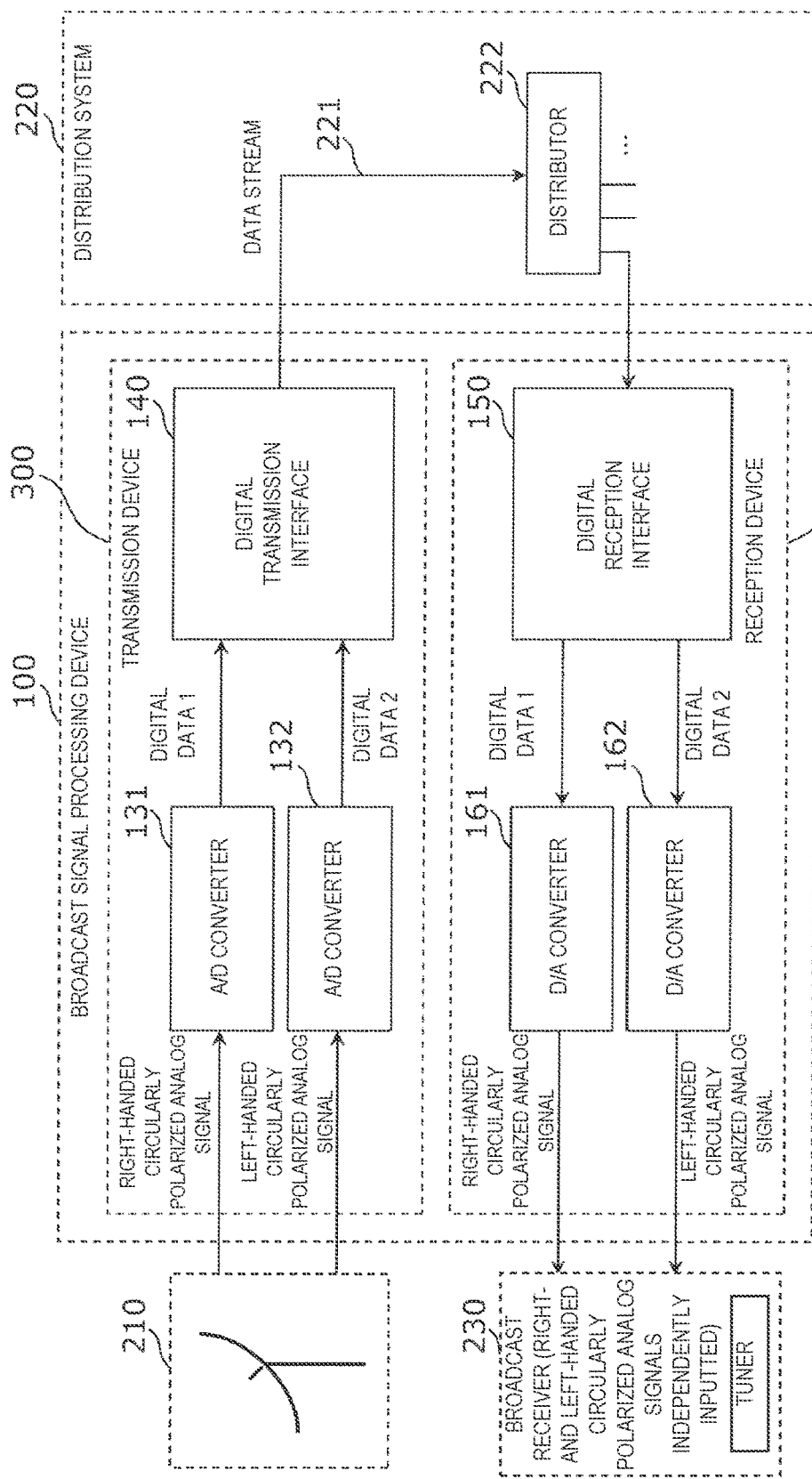
FIG. 1 is a block diagram of an example of a functional configuration of a broadcast signal processing device in accordance with a first embodiment.

FIG. 1 is a block diagram of an example of the functional configuration of the broadcast signal processing device 100. FIG. 1 shows the broadcast signal processing device 100, as well as a receiving antenna 210, a distribution system 220, and a broadcast receiver 230. A right-handed circularly polarized analog signal and a left-handed circularly polarized analog signal are examples of broadcast signals with the same frequency band but different polarization. Here, the right-handed circularly polarized analog signal and the left-handed circularly polarized analog signal can be subjected to polarization division multiplexing with a broadcast wave from a satellite signal, for example.

The receiving antenna 210 receives the broadcast wave in which the right- and left-handed circularly polarized analog signals have undergone polarization division multiplexing. The receiving antenna 210 separates the right- and left-handed circularly polarized analog signals from this broadcast wave. Then, the receiving antenna 210 independently outputs the separated right- and left-handed circularly polarized analog signals. As an example, the receiving antenna 210 can be a parabolic antenna used for receiving satellite broadcasts. Here, the right-handed circularly polarized analog signal is an example of a first analog signal that is a broadcast signal of a specific polarity, while the left-handed circularly polarized analog signal is an example of a second analog signal that is a broadcast signal whose polarity is different from the specific polarity.

The distribution system 220 is a system that transfers broadcast signals that have been received by the receiving antenna 210. The distribution system 220 has a signal cable 221 and a distributor 222. The distribution system 220 distributes the broadcast signals to a plurality of locations. As an example, the distribution system 220 can be a CATV (Community Access Television or Community Antenna Television) system used in a group housing, such as a condominium, an apartment, and the like. The signal cable 221 can be constituted by a coaxial cable or an optical cable.

The broadcast receiver 230 is a typical receiver that acquires a broadcast signal and decodes it into video and audio signals. The broadcast receiver 230 has, for example, independent signal input terminals for each polarization wave in order to acquire the broadcast signals of the same frequency band but different polarization. As an example, the broadcast receiver 230 can be a digital television set, a recorder, or a set-top box. In the illustrated embodiment, the broadcast receiver 230 also includes a tuner that tunes in or selects at least one broadcast signal based on at least one of the right- and left-handed circularly polarized analog signals.

The broadcast signal processing device 100 includes a transmission device 300 and a reception device 400. The broadcast signal processing device 100 can be formed, for example, by a digital signal processor, a dedicated hardware circuit, or a combination of these.

The transmission device 300 has a plurality of analog-digital (A/D) converters 131 and 132, and a digital transmission interface 140. The A/D converters 131 and 132 acquire the broadcast signals that have been separated from the broadcast wave that has undergone polarization division multiplexing. The A/D converters 131 and 132 converts the broadcast signals into a plurality of sets of digital data (e.g., digital data 1 and digital data 2). The digital transmission interface 140 subjects the digital data converted by the A/D converters 131 and 132 to multiplexing into a single data stream. Thus, in the illustrated embodiment, the single data stream includes information of the digital data (e.g., the digital data 1 and the digital data 2). Then, the digital transmission interface 140 outputs the result to the distribution system 220. In the illustrated embodiment, the A/D converters 131 and 132, and the digital transmission interface 140 each can be formed by at least one digital signal processor, at least one dedicated hardware circuit, or a combination of these. The transmission device 300 can also include a controller that is formed by a microcomputer or processor (processing circuit) that controls various components of the transmission device 300. The controller can also include other conventional components such as an input interface circuit, an output interface circuit, and storage devices such as a ROM (Read Only Memory) and a RAM (Random Access Memory). The microcomputer or processor of the controller is programmed to control the various components of the transmission device 300. The RAM stores statuses of operational flags and various control data. The ROM stores control programs for various operations. It will also be apparent to those skilled in the art from this disclosure that the precise structure and algorithms for the controller can be any combination of hardware and software that will carry out the functions of the present disclosure.

The A/D converters 131 and 132 here are respectively examples of a first converter and a second converter in a transmission device. The digital transmission interface 140 is an example of a generation component and a transmitter. The digital data (digital data 1 and the digital data 2) is an example of a first digital signal and a second digital signal. The single data stream is an example of a third digital signal. In the illustrated embodiment, the A/D converter 131 converts the right-handed circularly polarized analog signal (e.g., the first analog signal) into the digital data 1 (e.g., the first digital signal). In the illustrated embodiment, the A/D converter 132 converts the left-handed circularly polarized analog signal (e.g., the second analog signal) into the digital data 2 (e.g., the second digital signal). In the illustrated embodiment, the digital transmission interface 140 generates the single data stream (e.g., the third digital signal) that includes information of the digital data 1 and 2 (e.g., the first and second digital data), and transmits the single data stream.

The reception device 400 has a digital reception interface 150 and a plurality of digital-analog (D/A) converters 161 and 162. The digital reception interface 150 acquires the above-mentioned data stream from the distribution system 220. The digital reception interface 150 restores the plurality of sets of digital data from the acquired data stream. The D/A converters 161 and 162 convert the digital data restored by the digital reception interface 150 (e.g., digital data 1 and digital data 2) into the above-mentioned broadcast signals (e.g., the right-handed circularly polarized analog signal and the left-handed circularly polarized analog signal). The D/A converters 161 and 162 output the right- and left-handed circularly polarized analog signals to the broadcast receiver 230. Here, the digital reception interface 150 is an example of an acquisition component, an extraction component, a first output component, and a second output component. The D/A converters 161 and 162 are respectively examples of a first converter and a second converter in a reception device. In the illustrated embodiment, the digital reception interface 150 and the D/A converters 161 and 162 each can be formed by at least one digital signal processor, at least one dedicated hardware circuit, or a combination of these. The reception device 400 can also include a controller that is formed by a microcomputer or processor (processing circuit) that controls various components of the reception device 400. The controller can also include other conventional components such as an input interface circuit, an output interface circuit, and storage devices such as a ROM (Read Only Memory) and a RAM (Random Access Memory). The microcomputer or processor of the controller is programmed to control the various components of the reception device 400. The RAM stores statuses of operational flags and various control data. The ROM stores control programs for various operations. It will also be apparent to those skilled in the art from this disclosure that the precise structure and algorithms for the controller can be any combination of hardware and software that will carry out the functions of the present disclosure.

The transmission device 300 and the reception device 400 are separated and respectively disposed at the input end and the output end of the distribution system 220. There are no particular restrictions on the mounting of the transmission device 300 and the reception device 400. However, as an example, the transmission device 300 can be disposed as an independent device between the receiving antenna 210 and the distribution system 220, or can be built into the receiving antenna 210 or the distribution system 220. The reception device 400 can be disposed as an independent device between the distribution system 220 and the broadcast receiver 230, or can be built into the distribution system 220 or the broadcast receiver 230. In a specific example in which the distribution system 220 is a CATV system for group housing, the transmission device 300 can be installed near the receiving antenna 210 as shared equipment, and the reception device 400 can be installed in each room as private equipment.

With the broadcast signal processing device 100 thus configured, broadcast signals separated from the broadcast wave that has undergone polarization division multiplexing are converted into digital data multiplexed into a single data stream. Thus, they can be distributed using the single signal cable 221.

Therefore, there is no need to provide a plurality of signal cables for each polarization wave to the distribution system 220. Also, as opposed to when a plurality of broadcast signals are subjected to frequency division multiplexing while still in the form of analog signals and are then distributed with a single signal cable, there is no need to worry about avoiding frequency interference or dealing with image signals that are generated during frequency conversion or mixing. Thus, system design is simplified. Furthermore, because disturbance is less likely to have an effect, it is anticipated that the elimination of disturbance will be easier.

As a result, with the broadcast signal processing device 100, a broadcast signal processing device is obtained with which broadcast waves that have undergone polarization division multiplexing can be received and then simply distributed using the single signal cable 221.

Referring now to FIGS. 2 to 4B, the broadcast signal processing device 100 will be described in detail.

When the broadcast signals are converted into the digital data with the broadcast signal processing device 100, the bit rate of the digital data after conversion can be kept low according to the resolution that is selected for A/D conversion by the A/D converters 131 and 132. Keeping the bit rate low and reducing the frequency bandwidth taken up by the digital data reduces level attenuation during data distribution, and makes it even less likely that the signals will be affected by disturbance.

More specifically, the resolution in A/D conversion can be selected as follows.

FIG. 2 is a table showing the relation between quantization noise (SNR (signal-to-noise ratio); dB) and the resolution (number of bits) of A/D conversion, based on a typical quantization noise model. For instance, in the case of a sine wave, the SNR (dB) of A/D conversion is expressed by 1.76 (dB)+6.02 (dB)×the resolution (number of bits). Actually, the noise floor of the A/D converter and other forms of noise in the device itself must be taken into account, but basically the resolution and the SNR of the A/D converter are in the linear relation expressed by the above formula.

The lowest SNR at which the broadcast receiver 230 can receive a broadcast signal without any error is called the required SNR. The required SNR is determined by the performance of the broadcast receiver 230 and by the type of broadcast signal to be received. For example, the required SNR is approximately 20 dB when a terrestrial digital broadcast is received by a typical broadcast receiver. Thus, in the illustrated embodiment, the A/D converters 131 and 132 converts the broadcast signals (the right- and left-handed circularly polarized analog signals (e.g., the first and second analog signals)) into the digital data 1 and 2 (e.g., the first and second digital signals) at the resolution corresponding to the required SNR (e.g., the specific signal-to-noise ratio), respectively. In the illustrated embodiment, the transmission device 300 (e.g., the controller of the transmission device 300) determines the required SNR based on the broadcast signal type of the broadcast signals (e.g., the first and second analog signals), such as terrestrial, satellite, cable, and the like. In the illustrated embodiment, the transmission device 300 (e.g., the controller of the transmission device 300) determines that the required SNR is approximately 20 dB.

The broadcast signal processing device 100 needs to satisfy the required SNR. Accordingly, if the required SNR is 20 dB, for example, then an SNR of at least 20 dB is required for the A/D converters 131 and 132, and according to the above formula, the resolution of the A/D conversion must be at least 4 bits. Actually, it is necessary to select a resolution that provides some extra room for noise generated by the broadcast radio wave environment, the antenna, and so forth. However, if the resolution is selected based on the required SNR, then the resolution will not have to be raised beyond what is needed. Thus, the optimal number of bits can be selected.

The A/D converters 131 and 132 can convert the time waveforms of the plurality of broadcast signals (the rightand left-handed circularly polarized analog signals) into the plurality of sets of digital data (digital data 1 and 2). The "time waveform" of a signal refers to the time series of instantaneous values for the signal level. In this case, the A/D converters 131 and 132 can use a known technology such as pulse code modulation, for example, to convert the broadcast signals into the digital data. For instance, the broadcast signals are each converted into series of digital values obtained by sampling the levels of the individual broadcast signals at a frequency that is twice the highest frequency of the broadcast signals. The number of bits per sample is one that will satisfy the above-mentioned required SNR. Thus, in the illustrated embodiment, the A/D converters 131 and 132 (e.g., the first and second converters) convert the time waveforms of the broadcast signals (the right- and left-handed circularly polarized analog signals (e.g., the first and second analog signals)) into the digital data 1 and 2 (e.g., the first and second digital signals), respectively.

Also, the A/D converters 131 and 132 can convert the frequency spectrum of the plurality of broadcast signals (the right- and left-handed circularly polarized analog signals) into the plurality of sets of digital data (digital data 1 and 2). The "frequency spectrum" of a signal refers to the frequency components included for each specific time window of a signal. In this case, the A/D converters 131 and 132 can use Fourier transformation or another known technique to convert the broadcast signals into the digital data. For instance, the broadcast signals are converted into digital values expressing the magnitude of the frequency component included for each specific time window of an individual broadcast signal. Thus, in the illustrated embodiment, the A/D converters 131 and 132 (e.g., the first and second converters) convert the frequency spectrums of the broadcast signals (the right- and left-handed circularly polarized analog signals (e.g., the first and second analog signals)) into the digital data 1 and 2 (e.g., the first and second digital signals), respectively.

The sets of the digital data thus converted from the broadcast signals are multiplexed in a single data stream and transferred to the distribution system 220 by the digital transmission interface 140.

Figure 3:
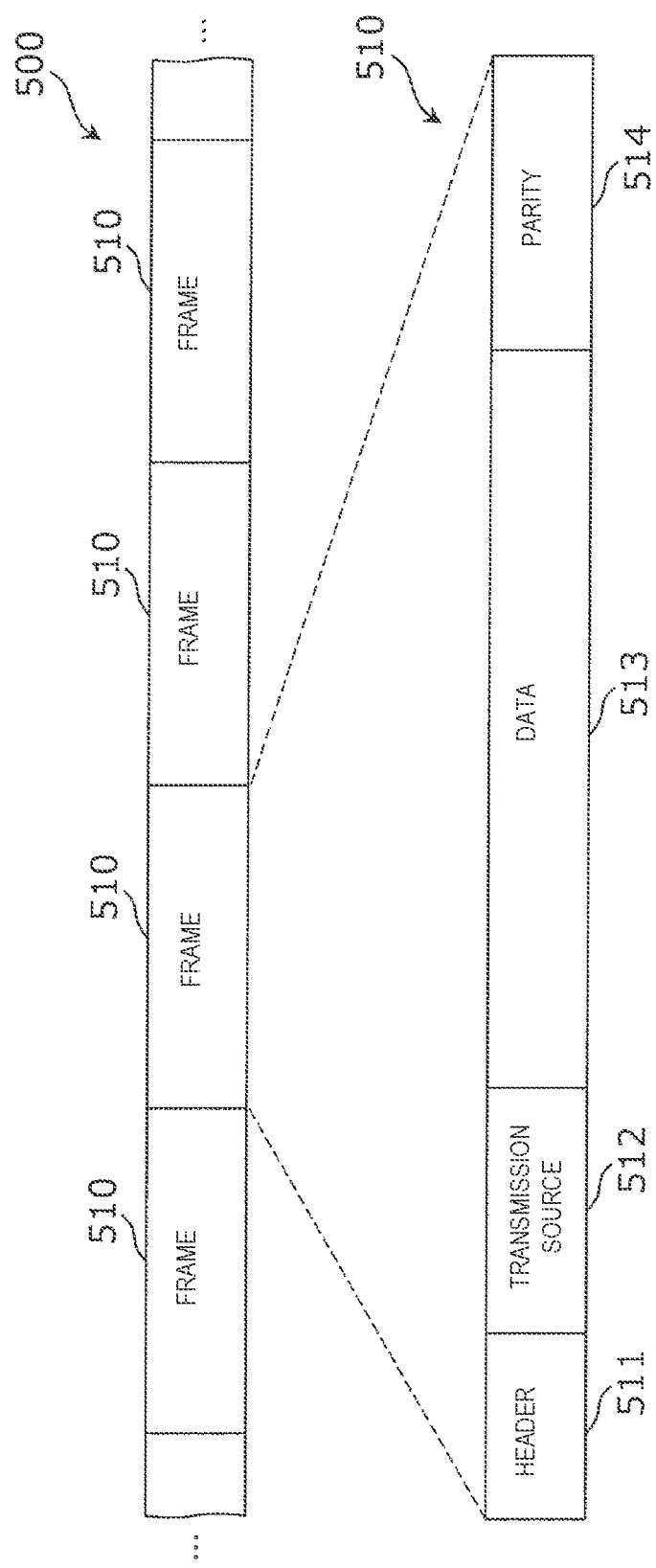
FIG. 3 is a diagram of an example of the format of a data stream in accordance with the first embodiment.

FIG. 3 is a diagram of an example of the format of a data stream. A data stream 500 is a sequence of frames 510. The frames 510 each have a data field 513 that holds one data portion obtained by dividing the plurality of sets of digital data into pieces of a specific size. According to this format, the digital data is multiplexed into the data stream 500, which can be efficiently processed by frame.

A start code indicating the front of a frame can be stored in a header field 511 of each frame 510. The start code stored in the header field 511 makes it easier to separate individual frames.

Transmission source identification information that identifies at least one of the A/D converters 131 and 132 that has generated the digital data stored in the frame 510 can be stored in a transmission source field 512 of the frame 510. Which data portion of the digital data is stored in the data field 513 of the frame 510 is immediately specified by the transmission source identification information stored in the transmission source field 512. Thus, restoration to the original digital data is easy.

A parity code for performing error correction of the frame 510 can be stored in a parity field 514 of the frame 510. The digital data can be made more resistant to disturbance by performing error correction on the frame 510 by means of the parity code stored in the parity field 514. Thus, in the illustrated embodiment, the data stream 500 (e.g., the third digital signal) includes information of the digital data 1 and 2 (e.g., the first and second digital data) in the digital data field 513. Also, in the illustrated embodiment, the data stream 500 (e.g., the fourth digital signal) includes information related to at least one of the digital data 1 and 2 (e.g., the first digital signal and the second digital signal). Specifically, in the illustrated embodiment, the data stream 500 (e.g., the fourth digital signal) includes the transmission source identification information (e.g., the signal) that identifies at least one of the A/D converters 131 and 132 as the information related to at least one of the digital data 1 and 2 (e.g., first digital signal and the second digital signal) in the transmission source field 512. Also, in the illustrated embodiment, the data stream 500 (e.g., the fourth digital signal) includes the parity code for performing error correction of the frame 510 (e.g., the signal for error correction of at least one of the first digital signal and the second digital signal) as the information related to at least one of the digital data 1 and 2 (e.g., the first digital signal and the second digital signal) in the parity field 514.

Figure 4A:
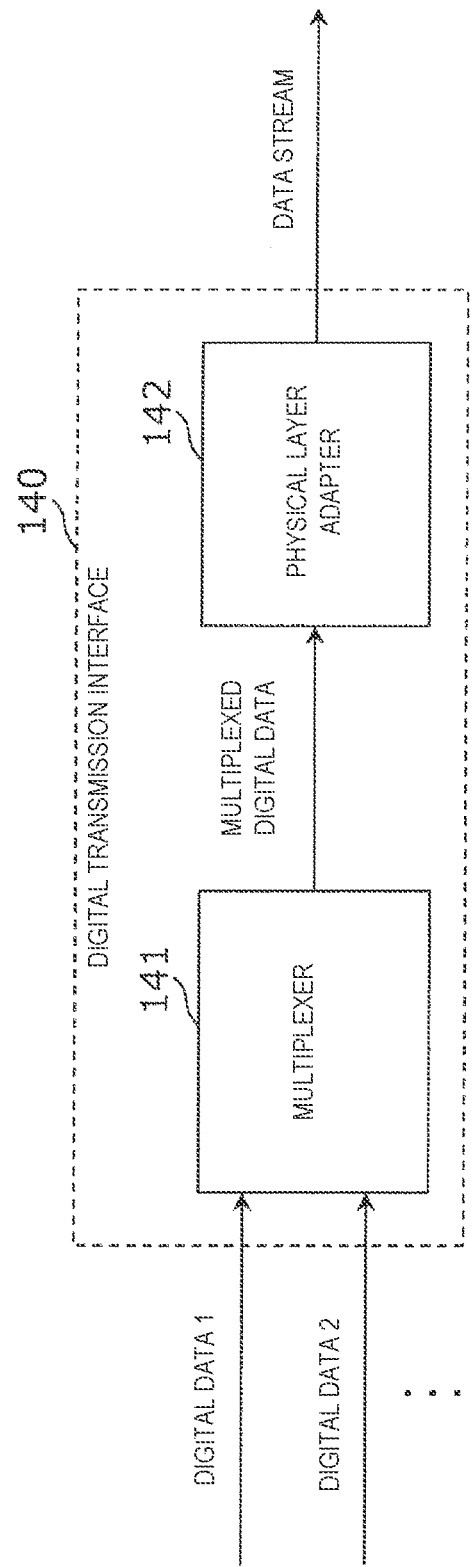
FIG. 4A is a block diagram of an example of a functional configuration of a digital transmission interface in accordance with the first embodiment.

FIG. 4A is a block diagram of an example of the functional configuration of the digital transmission interface 140.

The digital transmission interface 140 has a multiplexer 141 (e.g., generation component) and a physical layer adapter 142 (e.g., transmitter).

The multiplexer 141 acquires a plurality of sets of digital data from the A/D converters 131 and 132. The multiplexer 141 divides the sets of digital data into data portions of a specific size. The multiplexer 141 uses these data portions to generate multiplexed digital data expressing the data stream 500 in the format shown in FIG. 3, for example. The multiplexer 141 can store the start code, the transmission source identification information, and the parity code in this multiplexed digital data. The multiplexer 141 outputs the multiplexed digital data thus generated to the physical layer adapter 142.

The physical layer adapter 142 outputs a digital signal corresponding to the multiplexed digital data (that is, a data stream) to the distribution system 220. The physical layer adapter 142 can be formed by a coaxial transceiver or an optical transceiver, according to whether the signal cable 221 of the distribution system 220 is a coaxial cable or an optical cable. The physical layer adapter 142 can output an electrical signal or optical signal expressing the data stream to the signal cable 221. That is, the physical layer adapter 142 outputs a digital signal expressing the data stream in a format that is suitable for the configuration of the distribution system 220. Thus, in the illustrated embodiment, the multiplexer 141 (e.g., the generation component) generates the multiplexed digital data (the data stream (e.g., the third digital signal) that includes information of the digital data 1 and 2 (e.g., the first and second digital signals). The physical layer adapter 142 (e.g., the transmitter) transmits the digital signal corresponding to the multiplexed digital data (the data stream (e.g., the third digital signal) generated by the multiplexer multiplexer 141. In the illustrated embodiment, the multiplexer 141 (e.g., the generation component) generates the multiplexed digital data (e.g., the third digital signal) as the single data stream by multiplexing the digital data 1 and 2 (e.g., the first and second digital signals). In the illustrated embodiment, the multiplexer 141 (e.g., the generation component) generates the multiplexed digital data (e.g., the third digital signal and the fourth digital signal) as the single data stream by multiplexing the information of the digital data 1 and 2 (e.g., the first and second digital signals) and the information related to at least one of the digital data 1 and 2 (e.g., the first digital signal and the second digital signal), such as the transmission source identification information, the parity code for performing error correction of the frame 510, and the like.

As a non-limiting example, the physical layer adapter 142 and the distribution system 220 can output and transfer the data stream according to the SDI (serial digital interface) standard.

The data stream is restored to the original sets of digital data (e.g., the digital data 1 and the digital data 2) by the digital reception interface 150 after being distributed by the distribution system 220.

Figure 4B:
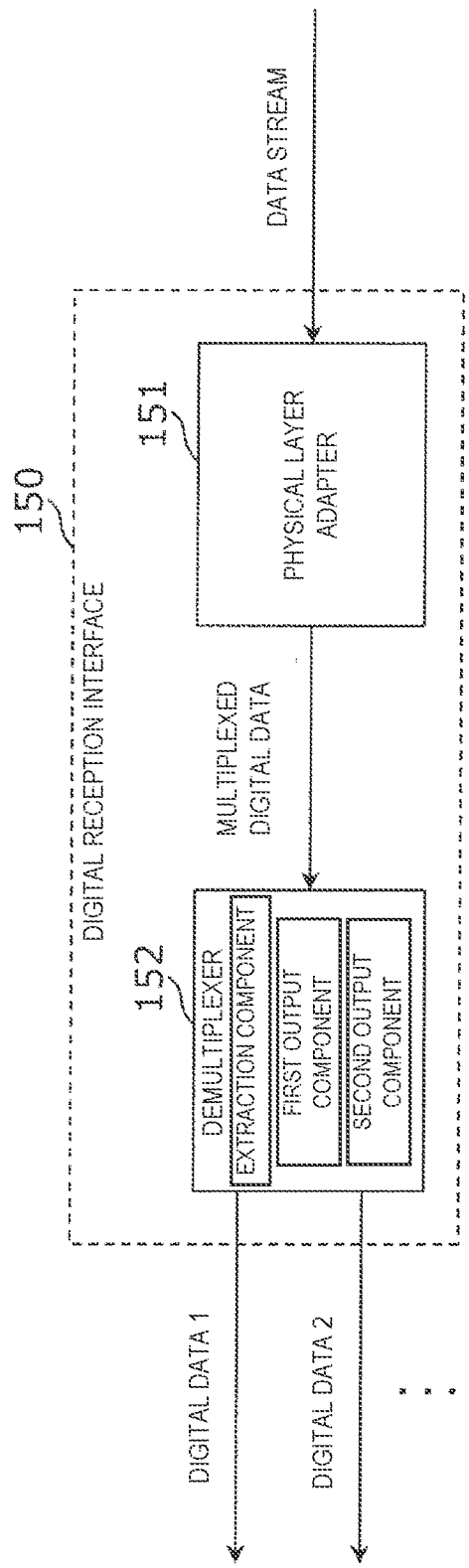
FIG. 4B is a block diagram of an example of a functional configuration of a digital reception interface in accordance with the first embodiment.

FIG. 4B is a block diagram of an example of the functional configuration of the digital reception interface 150.

The digital reception interface 150 has a physical layer adapter 151 (e.g., the acquisition component) and a demultiplexer 152 (e.g., the extraction component, the first output component, and the second output component).

The physical layer adapter 151 acquires the data stream from the distribution system 220. The physical layer adapter 151 outputs the multiplexed digital data (e.g., the data stream 500) expressing the acquired data stream to the demultiplexer 152. The physical layer adapter 151 is similar to the physical layer adapter 142 in that it can be formed by a coaxial transceiver or an optical transceiver, according to the configuration of the distribution system 220.

The demultiplexer 152 restores the original sets of digital data (e.g., the digital data 1 and the digital data 2) by extracting data portions from the frames 510 of the multiplexed digital data (e.g., the data stream 500) and combining them. Then, the demultiplexer 152 outputs each set of restored digital data to corresponding one of the D/A converters 161 and 162.

When the frames 510 hold the start codes, then the demultiplexer 152 can detect that start code to specify the range of each frame 510.

When the frames 510 hold the transmission source identification information, then the demultiplexer 152 can combine the data portions included in the frames 510 with the same transmission source identification information to restore the original digital data. The transmission source identification information can also be omitted by determining in advance the order in which the digital data will be stored in the frames 510.

When the frames 510 hold the parity codes, the demultiplexer 152 can use these parity codes to perform error correction on the frames 510, and combine the data portions after error correction to restore the original digital data.

The digital data restored from the data stream is converted into the original broadcast signals by the D/A converters 161 and 162, that is, into a plurality of broadcast signals that have been separated from the broadcast wave that has undergone polarization division multiplexing. Then, the result is outputted to the broadcast receiver 230. Thus, in the illustrated embodiment, the reception device 400 includes the physical layer adapter 151 (e.g., the acquisition component) and the demultiplexer 152 (e.g., the extraction component, the first output component, and the second output component). Also, in the illustrated embodiment, the reception device 400 includes the D/A converters 161 and 162 (e.g., the first and second converters). The physical layer adapter 151 acquires the data stream (e.g., the digital signal) generated based on the broadcast signals (the right- and left-handed circularly polarized analog signals (e.g., the first and second analog signals)). The demultiplexer 152 (e.g., the extraction component) extracts from the data stream (e.g., the digital signal) the digital data 1 and 2 (e.g., the first digital signal generated based on the first analog signal and the second digital signal generated based on the second analog signal). The demultiplexer 152 (e.g., the first output component) outputs the digital data 1 (e.g., the first digital signal). The demultiplexer 152 (e.g., second output component) outputs the digital data 2 (e.g., the second digital signal). The D/A converter 161 (e.g., the first converter) converts the digital data 1 (e.g., the first digital signal) outputted from the demultiplexer 152 (e.g., the first output component) into the right-handed circularly polarized analog signal (e.g., the first analog signal). The D/A converter 162 (e.g., the second converter) converts the digital data 2 (e.g., the second digital signal) outputted from the demultiplexer 152 (e.g., the second output component) into the left-handed circularly polarized analog signal (e.g., the second analog signal).

As described above, with the broadcast signal processing device 100, the plurality of broadcast signals that have been separated from the broadcast wave that has undergone polarization division multiplexing are converted into the digital data, multiplexed into a single data stream, and transferred. As a result, a broadcast signal processing device is obtained with which a single signal cable can be used for simple distribution after the reception of the broadcast wave that has undergone polarization division multiplexing. Also, a simple transmission device 300 for distributing a plurality of broadcast signals of different polarity, using a single signal cable, from the receiving antenna 210 to the broadcast receiver 230.

Also, with the broadcast signal processing device 100, a broadcast signal processing method is performed that comprises converting the right-handed circularly polarized analog signal (e.g., the first analog signal) into the digital data 1 (e.g., the first digital signal) by the A/D converter 131, converting the left-handed circularly polarized analog signal (e.g., the second analog signal) into the digital data 2 (e.g., the second digital signal) by the A/D converter 132, combining the digital data 1 and 2 (e.g., the first digital signal and the second digital signal) as the data stream (e.g., the combined digital signal), and transmitting the data stream (e.g., the combined digital signal) by the digital transmission interface 140, receiving the data stream (e.g., the combined digital signal), and extracting the digital data 1 and 2 (e.g., the first digital signal and the second digital signal) by the digital reception interface 150, converting the digital data 1 (e.g., the first digital signal) that has been extracted into the right-handed circularly polarized analog signal (e.g., the first analog signal) by the D/A converter 161, and converting the digital data 2 (e.g., the second digital signal) that has been extracted into the left-handed circularly polarized analog signal (e.g., the second analog signal) by the D/A converter 162.

Second Embodiment

Figure 5A:
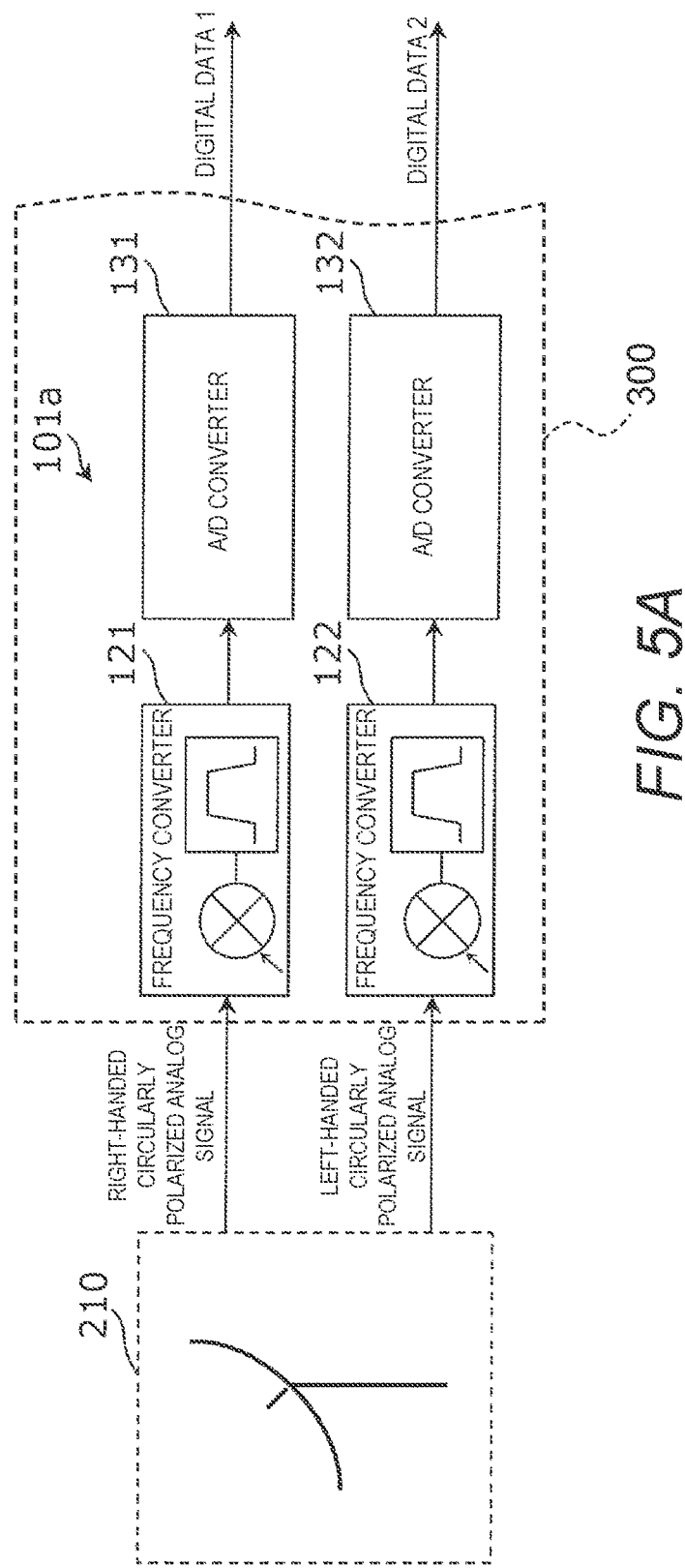
FIG. 5A is a block diagram of an example of a functional configuration of main components of a broadcast signal processing device in accordance with a second embodiment.
Figure 5B:
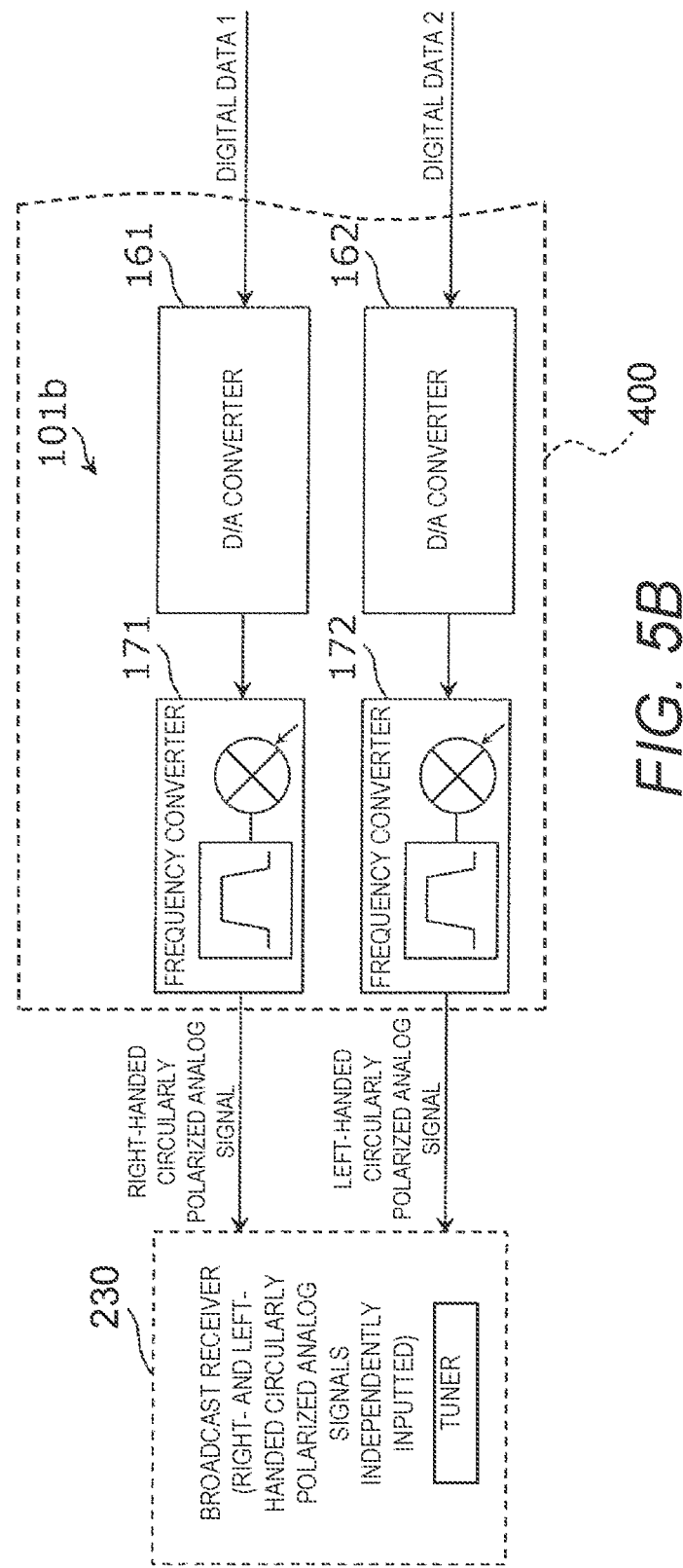
FIG. 5B is a block diagram of an example of a functional configuration of main components of the broadcast signal processing device in accordance with the second embodiment.

Referring now to FIGS. 5A and 5B, a broadcast signal processing device 100 in accordance with a second embodiment will be described. The broadcast signal processing device 100 in accordance with the second embodiment is basically identical to the broadcast signal processing device 100 in accordance with the first embodiment, except that the broadcast signal processing device 100 in accordance with the second embodiment additionally has a plurality of frequency converters 121 and 122 for down-converting a plurality of broadcast signals. In the following description, the parts of the second embodiment that are identical or similar to the parts of the first embodiment will be given the same reference numerals as the parts of the first embodiment, and will not be described again for the sake of brevity. The description will focus on the part that is added in the second embodiment.

FIG. 5A is a block diagram of an example of the functional configuration of main components 101a of a transmission device 300 of the broadcast signal processing device 100 in accordance with the second embodiment. The main components 101a shown in FIG. 5A differ from the corresponding portion of the broadcast signal processing device 100 in FIG. 1 in that the frequency converters 121 and 122 are added ahead of A/D converters 131 and 132, respectively. The frequency converters 121 and 122 here are an example of a third converter.

The right-handed circularly polarized analog signal and left-handed circularly polarized analog signal shown in FIG. 5A each have a frequency band from approximately 1 GHz to approximately 2 GHz. Therefore, basically, it is necessary to subject an analog signal of approximately 2 GHz at the highest to A/D conversion.

In view of this, in the illustrated embodiment, a plurality of broadcast signals are down-converted by the frequency converters 121 and 122. For instance, the right-handed circularly polarized analog signal and the left-handed circularly polarized analog signal are each down-converted to a frequency band of from 0 to approximately 1 GHz. The broadcast signals after the down conversion undergo A/D conversion by the A/D converters 131 and 132, and are outputted as digital data 1 and 2, respectively. In the illustrated embodiment, a digital transmission interface 140 (FIG. 1) of the transmission device 300 subjects the digital data 1 and 2 to multiplexing into a single data stream in a manner described in the first embodiment, and outputs the data stream to the distribution system 220.

The result of doing this is that the performance requirements for the A/D converters 131 and 132 relative to the maximum frequency are lowered. Thus, simpler and less expensive A/D converters 131 and 132 can be utilized. Also, the bit rate is kept low and the frequency bandwidth taken up by the digital data is smaller. This reduces the level attenuation during data distribution, and makes disturbance less likely to have an effect.

In the illustrated embodiment, the frequency converters 121 and 122 are both provided to the broadcast signal processing device 100. However, only one of the frequency converters 121 and 122 can be provided. For instance, one of the frequency converters 121 and 122 can be provided corresponding to either the right-handed circularly polarized analog signal or the left-handed circularly polarized analog signal, whichever one has a higher maximum frequency. Thus, in the illustrated embodiment, the transmission device 300 comprises the at least one of the frequency converters 121 and 122 (e.g., the third converter). The at least one of the frequency converters 121 and 122 (e.g., the third converter) converts the frequency of at least one of the right- and left-handed circularly polarized analog signals (e.g., the first and second analog signals) prior to conversion of the at least one of the right- and left-handed circularly polarized analog signals by corresponding one of the A/D converters 131 and 132 (e.g., the first and second converters).

The configuration of a reception device 400 of the broadcast signal processing device 100 can be modified to correspond to the main components 101a of the transmission device 300.

FIG. 5B is a block diagram of an example of the functional configuration of main components 101b of the reception device 400 of the broadcast signal processing device 100 in accordance with the second embodiment. The main components 101b shown in FIG. 5B differ from the corresponding portion of the broadcast signal processing device 100 in FIG. 1 in that frequency converters 171 and 172 are added after D/A converters 161 and 162. In the illustrated embodiment, a digital reception interface 150 (FIG. 1) of the reception device 400 subjects the single data stream from the distribution system 220 to demultiplexing into the digital data 1 and 2 in a manner described in the first embodiment, and outputs the digital data 1 and 2 to the D/A converters 161 and 162, respectively.

Since the broadcast signals are down-converted at the main components 101a of the transmission device 300, the broadcast signals of the frequency band after down conversion are outputted from the D/A converters 161 and 162. In view of this, these broadcast signals are up-converted by the frequency converters 171 and 172 to generate the broadcast signals of the original frequency band, and then are supplied to a broadcast receiver 230. Consequently, the broadcast receiver 230 can be used as it is, while the effect of down conversion can be obtained.

Up conversion is not limited to be performed by the frequency converters 171 and 172, and can also be performed by some other method, such as over-sampling with the D/A converters 161 and 162. Also, up conversion can be omitted by modifying the broadcast receiver 230 so that it operates with the broadcast signals of the down-converted frequency band.

Third Embodiment

Figure 6A:
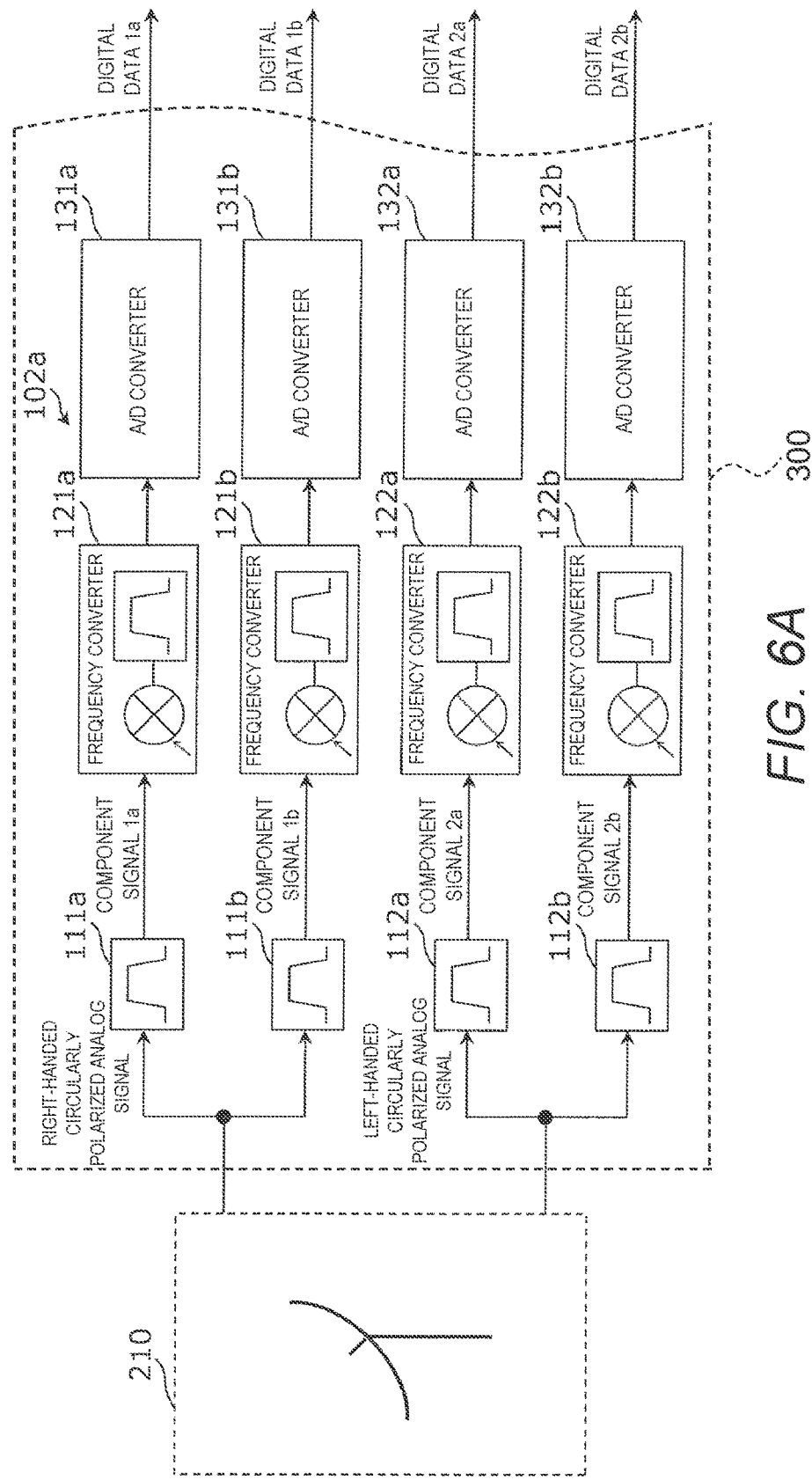
FIG. 6A is a block diagram of an example of a functional configuration of main components of a broadcast signal processing device in accordance with a third embodiment.
Figure 6B:
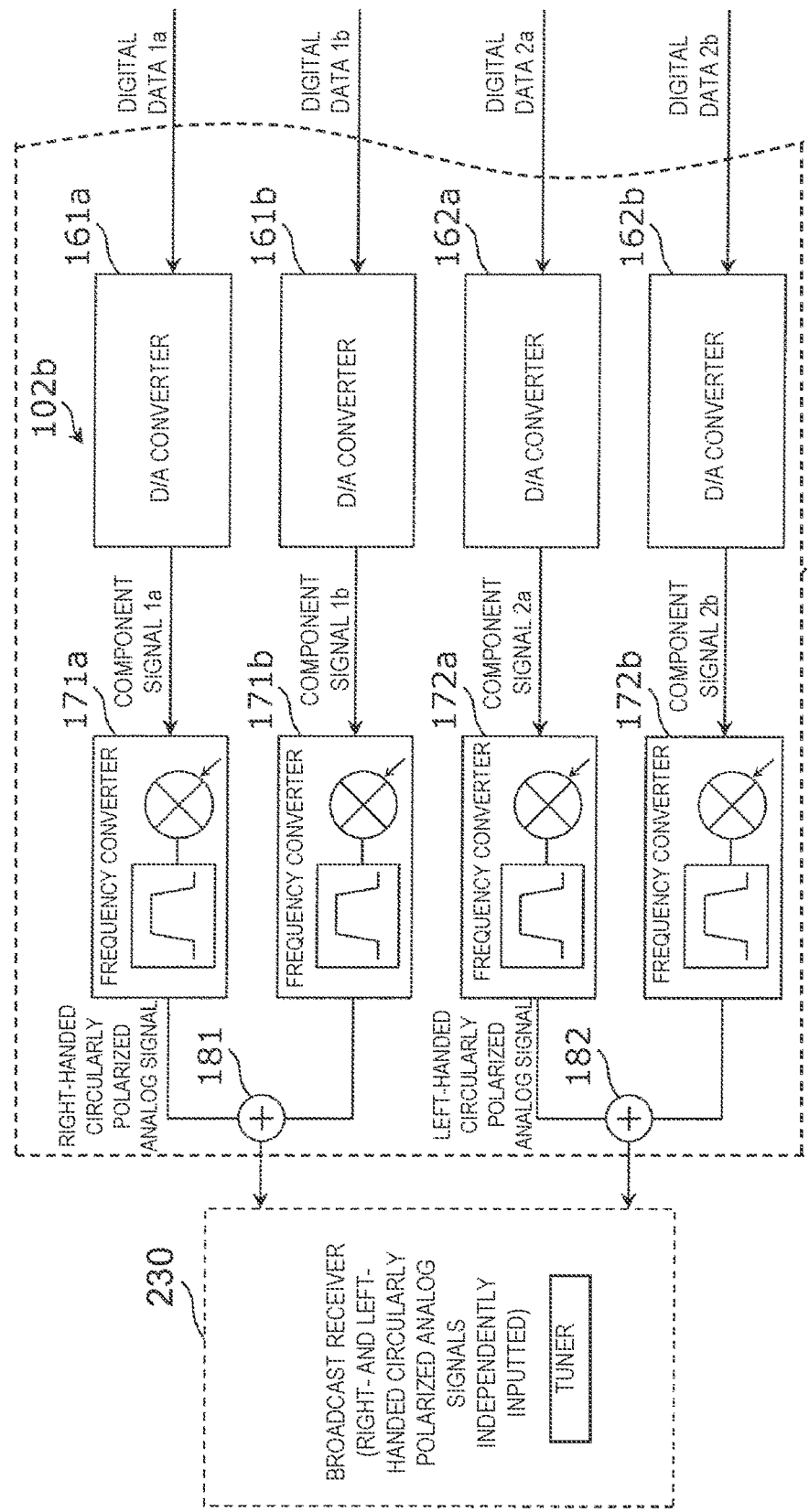
FIG. 6B is a block diagram of an example of a functional configuration of main components of the broadcast signal processing device in accordance with the third embodiment.
Figure 7:
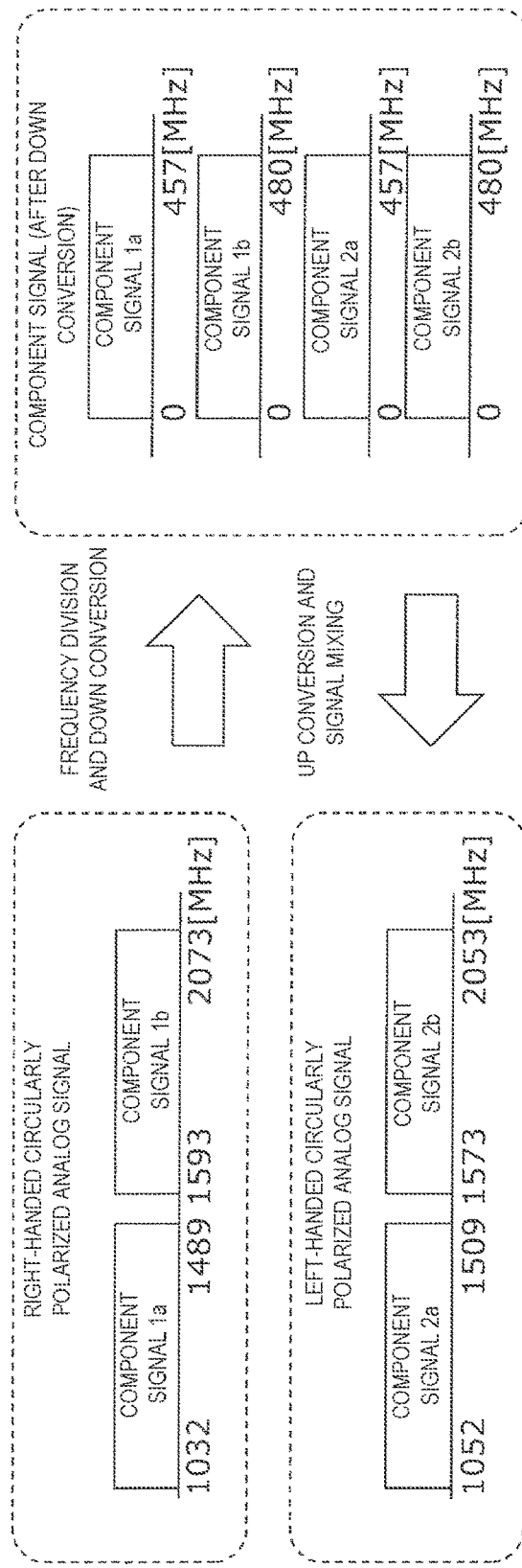
FIG. 7 is a diagram of an example of the frequency band of a broadcast signal processed with the broadcast signal processing device in accordance with the third embodiment.

Referring now to FIGS. 6A to 7, a broadcast signal processing device 100 in accordance with a third embodiment will be described. The broadcast signal processing device 100 in accordance with the third embodiment is basically identical to the broadcast signal processing device 100 in accordance with the first embodiment, except that the broad cast signal processing device 100 in accordance with the third embodiment has a plurality of filters 111a, 111b, 112a, and 112b, a plurality of frequency converters 121a, 121b, 122a, and 122b, and a plurality of A/D converters 131a, 131b, 132a, and 132b. The filters 111a, 111b, 112a, and 112b are provided for subjecting each of a plurality of broadcast signals to frequency division. The frequency converters 121a, 121b, 122a, and 122b are provided for down-converting the component signals after frequency division. In the following description, the parts of the third embodiment that are identical or similar to the parts of the first embodiment will be given the same reference numerals as the parts of the first embodiment, and will not be described again for the sake of brevity. The description will focus on the part that is added in the third embodiment.

FIG. 6A is a block diagram of an example of the functional configuration of main components 102a of a transmission device 300 of the broadcast signal processing device 100 in accordance with the third embodiment. The main components 102a shown in FIG. 6A differ from the corresponding portion of the broadcast signal processing device 100 in FIG. 1 in that the A/D converters 131a, 131b, 132a, and 132b are modified, and the filters 111a, 111b, 112a, and 112b and the frequency converters 121a, 121b, 122a, and 122b are added.

The right-handed circularly polarized analog signal and the left-handed circularly polarized analog signal shown as examples in FIG. 6A each have a frequency band from approximately 1 GHz to approximately 2 GHz, just as in FIG. 5A. Therefore, basically, it is necessary to subject analog signals with a frequency bandwidth of approximately 1 GHz to A/D conversion.

In view of this, in the illustrated embodiment, first the broadcast signals are divided by the filters 111a, 111b, 112a, and 112b into a plurality of component signals having mutually different frequency bands. For instance, the right-handed circularly polarized analog signal is subjected to frequency division into a component signal 1a of roughly the lower half of the frequency band (from approximately 1 GHz to approximately 1.5 GHz) and a component signal 1b of roughly the upper half (from approximately 1.5 GHz to approximately 2 GHz). The left-handed circularly polarized analog signal is similarly subjected to frequency division into a component signal 2a and a component signal 2b.

The component signals are then down-converted by the frequency converters 121a, 121b, 122a, and 122b. For instance, the component signals 1a, 1b, 2a, and 2b are each down-converted to a frequency band of from 0 to approximately 0.5 GHz. After down conversion the component signals undergo A/D conversion by the A/D converters 131a, 131b, 132a, and 132b, and are outputted as digital data 1a, 1b, 2a, and 2b, respectively. In the illustrated embodiment, a digital transmission interface 140 (FIG. 1) of the transmission device 300 subjects the digital data 1a, 1b, 2a, and 2b to multiplexing into a single data stream in a manner described in the first embodiment, and outputs the data stream to the distribution system 220. In the illustrated embodiment, the transmission device 300 comprises the filters 11a, 11b, 112a, and 112b. The filters 111a, 111b, 112a, and 112b pass a specific frequency band of the right- and left-handed circularly polarized analog signals (e.g., at least one of the first and second analog signals) prior to frequency conversion by the frequency converters 121a, 121b, 122a, and 122b (e.g., the third converters).

Doing this lowers the performance requirements of the A/D converters 131a, 131b, 132a, and 132b related to the highest frequency and the bandwidth. This makes it possible to use the simpler, less expensive A/D converters 131a, 131b, 132a, and 132b. Also, the bit rate is kept low and the frequency bandwidth taken up by the digital data 1a, 1b, 2a, and 2b is smaller. This reduces the level attenuation during data distribution, and makes disturbance less likely to have an effect.

The configuration of a reception device 400 of the broadcast signal processing device 100 in accordance with the third embodiment can also be modified as follows to correspond to the main components 102a of the transmission device 300.

FIG. 6B is a block diagram of an example of the functional configuration of main components 102b of the reception device 400 of the broadcast signal processing device 100 in accordance with the third embodiment. The main components 102b shown in FIG. 6B differ from the corresponding portion of the broadcast signal processing device 100 in FIG. 1 in that a plurality of D/A converters 161a, 161b, 162a, and 162b are modified, and a plurality of frequency converters 171a, 171b, 172a, and 172b and a plurality of mixers 181 and 182 are added. In the illustrated embodiment, a digital reception interface 150 (FIG. 1) of the reception device 400 subjects the single data stream from the distribution system 220 to demultiplexing into the digital data 1a, 1b, 2a, and 2b in a manner described in the first embodiment, and outputs the digital data 1a, 1b, 2a, and 2b to the D/A converters 161a, 161b, 162a, and 162b, respectively.

Since the broadcast signals are subjected to frequency division and down conversion by the main components 102a of the transmission device 300, the broadcast signals of frequency bands resulting after the frequency division and the down conversion (e.g., the component signals 1a, 1b, 2a, and 2b) are outputted from the D/A converters 161a, 161b, 162a, and 162b.

In view of this, in the illustrated embodiment, the broadcast signals (e.g., the component signals 1a, 1b, 2a, and 2b) are up-converted by the frequency converters 171a, 171b, 172a, and 172b, and mixed by the mixers 181 and 182 to generate the broadcast signals with the original frequency band (e.g., the right-handed circularly polarized analog signal and the left-handed circularly polarized analog signal). Then, the broadcast signals are supplied to the broadcast receiver 230. Consequently, the broadcast receiver 230 can be used just as it is, while still obtaining the effect generated by frequency division and down conversion.

Furthermore, up conversion is not limited to be performed by the frequency converters 171a, 171b, 172a, and 172b, and can be performed by some other method, such as over-sampling with the D/A converters 161a, 161b, 162a, and 162b.

The frequency band is not limited to being divided in two, and can be divided into three or more parts. Also, regarding the resolution of A/D conversion of the component signals after division, just as discussed above, the optimal number of bits can be selected based on the required SNR.

A specific numerical value example of the frequency band of the broadcast signals processed by the broadcast signal processing device 100 will now be discussed.

FIG. 7 is a diagram of an example of the frequency band. As shown in FIG. 7, the component signal 1a of the right-handed circularly polarized analog signal is assigned to a frequency band of from 1032 MHz to 1489 MHz, and the component signal 1b is assigned to a frequency band of from 1593 MHz to 2073 MHz. The right-handed circularly polarized analog signal in which the component signals 1a and 1b are mixed is taken off from the receiving antenna 210.

The right-handed circularly polarized analog signal is subjected by the transmission device 300 of the broadcast signal processing device 100 to frequency division and down conversion into the component signal 1a with a frequency band of from 0 MHz to 457 MHz, and the component signal 1b with a frequency band of from 0 MHz to 480 MHz.

As an example, the component signal 2a of the left-handed circularly polarized analog signal is assigned to a frequency band of from 1052 MHz to 1509 MHz, and the component signal 2b is assigned to a frequency band of from 1573 MHz to 2053 MHz. The left-handed circularly polarized analog signal in which the component signals 2a and 2b are mixed is taken off from the receiving antenna 210.

The left-handed circularly polarized analog signal is subjected by the transmission device 300 of the broadcast signal processing device 100 to frequency division and down conversion into the component signal 2a with a frequency band of from 0 MHz to 457 MHz, and the component signal 2b with a frequency band of from 0 MHz to 480 MHz.

At the reception device 400 of the broadcast signal processing device 100, the component signals 1a and 1b are up-converted and mixed, thereby restoring the original right-handed circularly polarized analog signal. Also, the component signals 2a and 2b are up-converted and mixed to restore the original left-handed circularly polarized analog signal.

Fourth Embodiment

Figure 8:
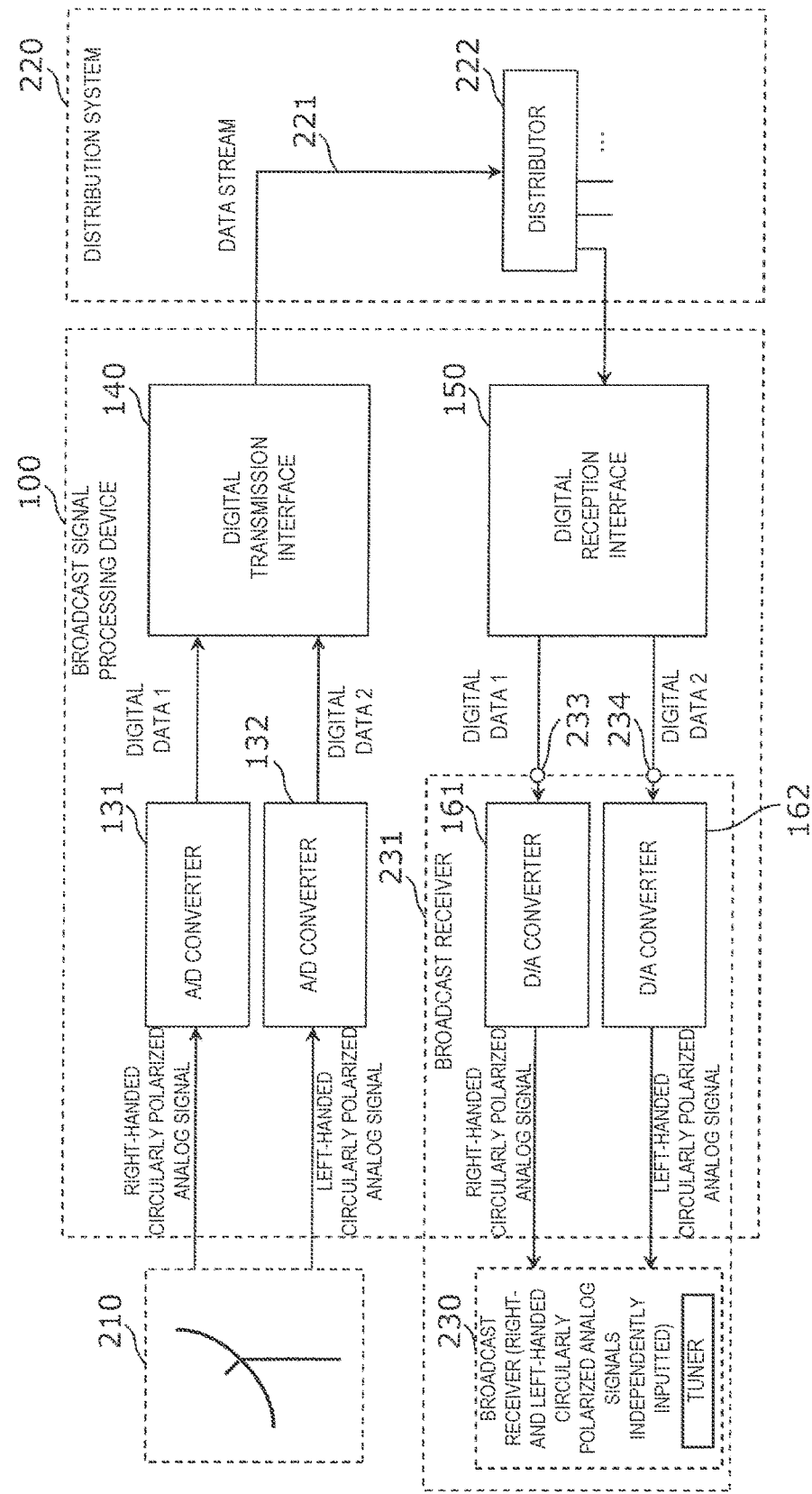
FIG. 8 is a block diagram of an example of a functional configuration of a broadcast signal processing device in accordance with a fourth embodiment.
Figure 9:
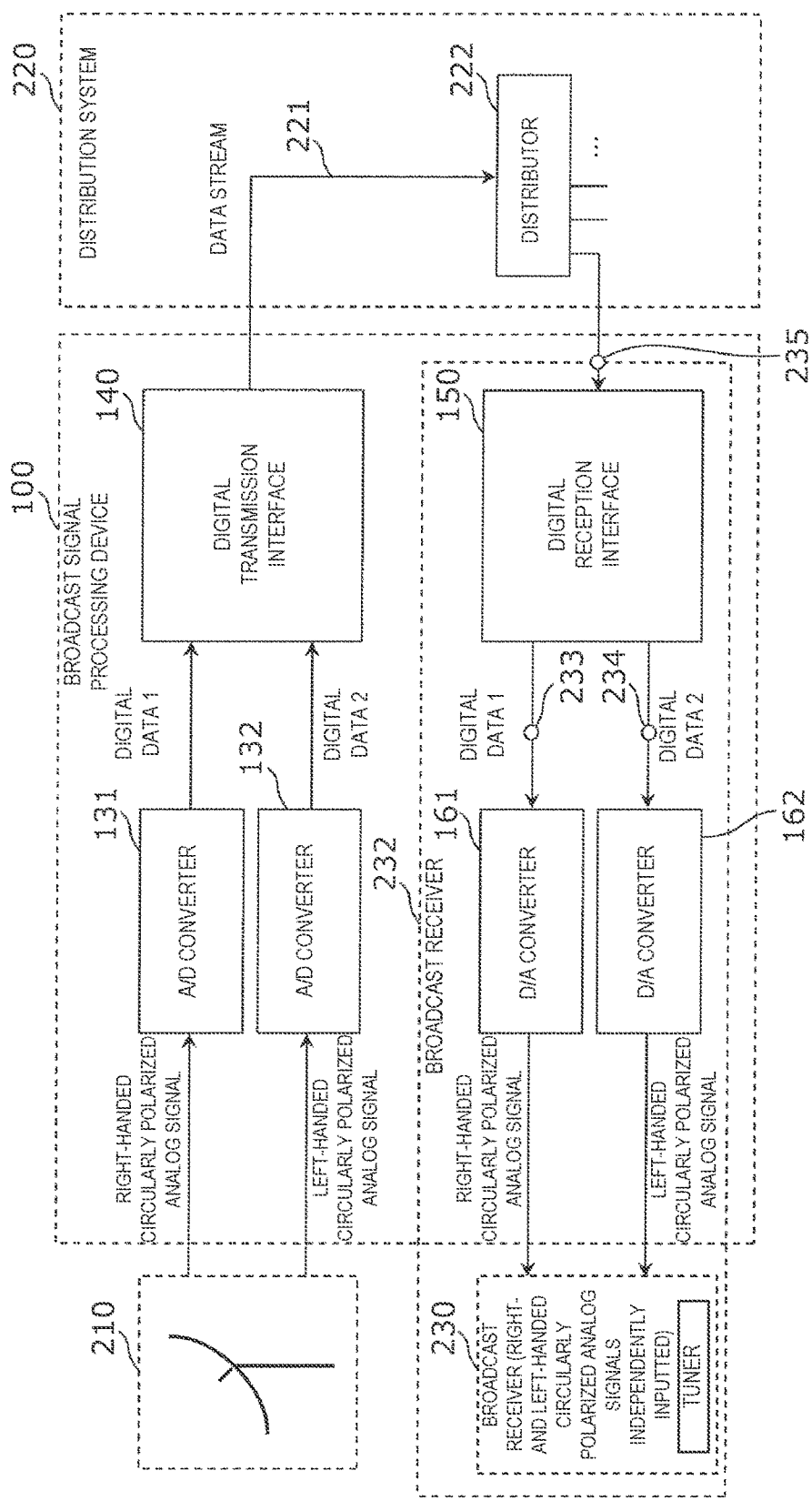
FIG. 9 is a block diagram of another example of a functional configuration of a broadcast signal processing device in accordance with the fourth embodiment.

Referring now to FIGS. 8 and 9, a broadcast signal processing device 100 in accordance with a fourth embodiment will be described. As shown in FIGS. 8 and 9, the broadcast signal processing device 100 has at least some of the constituent elements built into a broadcast receiver. In the following description, the parts of the fourth embodiment that are identical or similar to the parts of the first embodiment will be given the same reference numerals as the parts of the first embodiment, and will not be described again for the sake of brevity.

FIG. 8 is a block diagram of an example of the functional configuration of the broadcast signal processing device 100 in accordance with the fourth embodiment. With the broadcast signal processing device 100 shown in FIG. 8, D/A converters 161 and 162 are built into a broadcast receiver 231. That is, the broadcast receiver 231 includes the typical broadcast receiver 230 and the D/A converters 161 and 162 discussed above. For example, in the illustrated embodiment, the broadcast receiver 231 includes the broadcast receiver 230 and the D/A converters 161 and 162 in a housing to form a single independent device. The broadcast receiver 231 acquires digital data for each polarization by independent signal input terminals 233 and 234, and decodes the digital data into video and audio signals.

The signal input terminals 233 and 234 are examples of a first acquisition component that acquires a first digital signal generated based on a first analog signal that is a broadcast signal of a specific polarity, and a second digital signal generated based on a second analog signal that is a broadcast signal whose polarity is different from the specific polarity. The D/A converter 161 is an example of a first converter that converts the first digital signal into an analog signal, and the D/A converter 162 is an example of a second converter that converts the second digital signal into an analog signal. The broadcast receiver 230 also includes a tuner that tunes in or selects at least one broadcast signal from among at least one of the analog signals converted by the first converter and the second converter. Thus, in the illustrated embodiment, the broadcast receiver 231 comprises the signal input terminals 233 and 234 (e.g., the first acquisition component), the D/A converters 161 and 162 (e.g., the first converter and the second converter), and the tuner of the broadcast receiver 230. The signal input terminals 233 and 234 acquire the digital data 1 and 2 (e.g., the first and second digital signals). The D/A converter 161 converts the digital data 1 (e.g., the first digital signal) into the right-handed circularly polarized analog signal (e.g., the first analog signal). The D/A converter 162 converts the digital data 2 (e.g., the second digital signal) into the left-handed circularly polarized analog signal (e.g., the second analog signal). The tuner of the broadcast receiver 230 selects at least one broadcast signal based on at least one of the right- and left-handed circularly polarized analog signal (e.g., the first and second analog signals) converted by the D/A converters 161 and 162 (e.g., the first and second converters).

FIG. 9 is a block diagram of another example of the functional configuration of the broadcast signal processing device 100 in accordance with the fourth embodiment. With the broadcast signal processing device 100 shown in FIG. 9, a digital reception interface 150 and D/A converters 161 and 162 are built into a broadcast receiver 232. That is, the broadcast receiver 232 includes the above-mentioned typical broadcast receiver 230, the digital reception interface 150, and the D/A converters 161 and 162. For example, in the illustrated embodiment, the broadcast receiver 232 includes the broadcast receiver 230, the digital reception interface 150, and the D/A converters 161 and 162 in a housing to form a single independent device. The broadcast receiver 232 acquires by a single signal input terminal 235 a data stream in which digital data for each polarization (e.g., digital data 1 and digital data 2) is multiplexed, and decodes the digital data into video and audio signals.

The signal input terminal 235 here is an example of a second acquisition component that acquires a digital signal generated based on a first analog signal that is a broadcast signal of a specific polarity and a second analog signal that is a broadcast signal whose polarity is different from the specific polarity. The digital reception interface 150 is an example of an extraction component that extracts the first digital signal and the second digital signal from the digital signal. The signal input terminals 233 and 234, which are examples of the first acquisition component, acquire the first digital signal and the second digital signal extracted by the extraction component. In the illustrated embodiment, the broadcast receiver 232 comprises the signal input terminal 235 (e.g., the second acquisition component), and the digital reception interface 150 (e.g., the extraction component). The signal input terminal 235 acquires the data stream (e.g., the digital signal) generated based on the right- and left-handed circularly polarized analog signals (e.g., the first and second analog signals). The digital reception interface 150 extract the digital data 1 and 2 (e.g., the first and second digital signals) from the data stream (e.g., the digital signal). The signal input terminals 233 and 234 (e.g., the first acquisition component) acquires the digital data 1 and 2 (e.g., the first and second digital signals) that have been extracted by the digital reception interface 150.

With this configuration, at least some of the constituent elements for processing signals acquired from the distribution system 220 are built into the broadcast receivers 231 and 232. Thus, there are fewer external parts that need to be disposed independently between the distribution system 220 and the broadcast receivers 231 and 232. Therefore, the configuration of the broadcast signal processing device 100 can be simplified.

Fifth Embodiment

Figure 10:
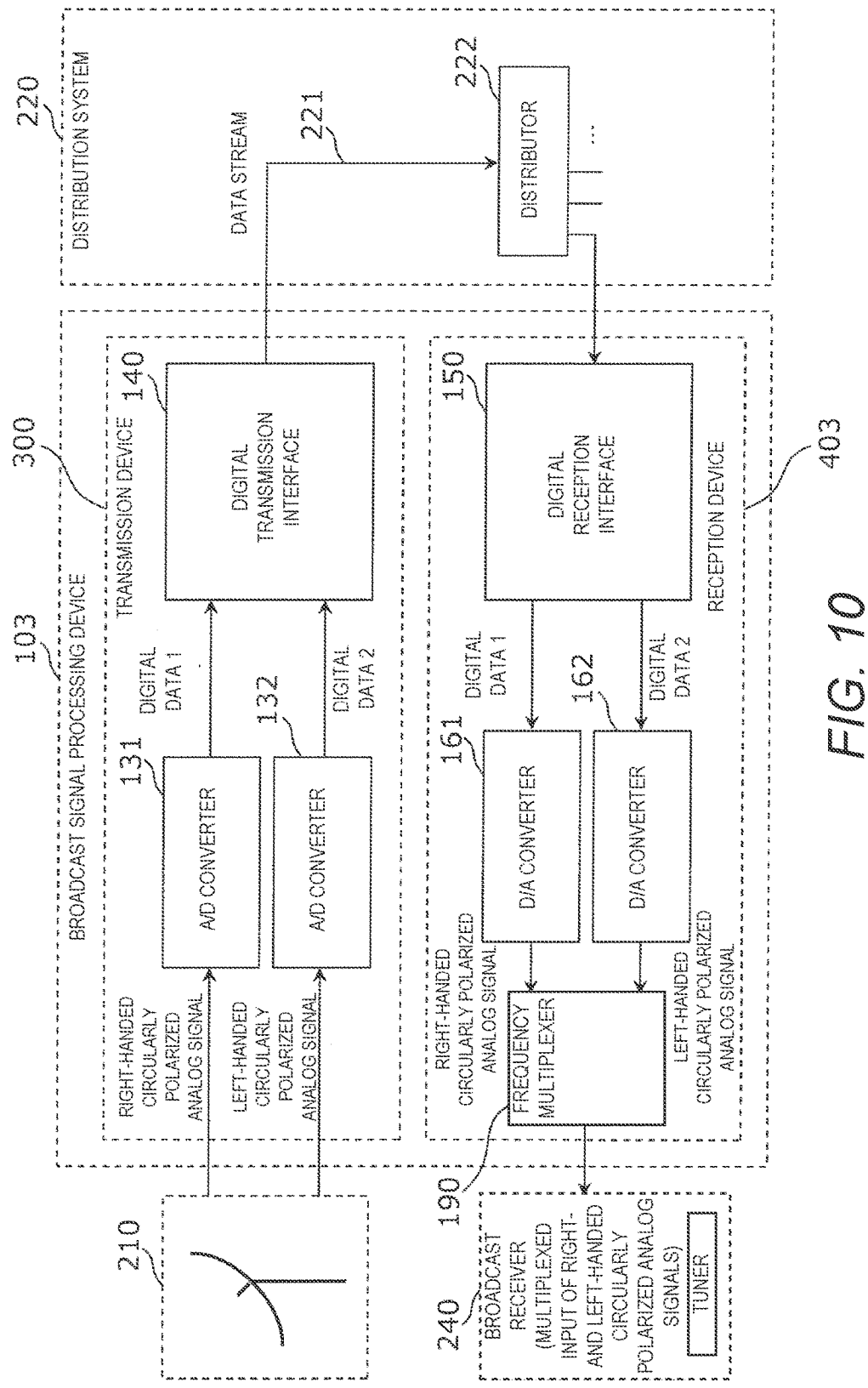
FIG. 10 is a block diagram of an example of a functional configuration of a broadcast signal processing device in accordance with a fifth embodiment.

Referring not to FIG. 10, a broadcast signal processing device 103 in accordance with a fifth embodiment will be described. With the broadcast signal processing device 103, the connection between the broadcast signal processing device 103 and a broadcast receiver 240 can be simplified. In the following description, the parts of the fifth embodiment that are identical or similar to the parts of the first embodiment will be given the same reference numerals as the parts of the first embodiment, and will not be described again for the sake of brevity.

FIG. 10 is a block diagram of an example of the functional configuration of the broadcast signal processing device 103 in accordance with the fifth embodiment. The broadcast signal processing device 103 shown in FIG. 10 differs from the broadcast signal processing device 100 in FIG. 1 in that a frequency multiplexer 190 is added to a reception device 403.

The frequency multiplexer 190 subjects broadcast signals for each polarization that have undergone D/A conversion by D/A converters 161 and 162 to frequency division multiplexing to obtain a single multiplexed signal. The frequency multiplexer 190 then outputs the multiplexed signal to a broadcast receiver 240. The frequency multiplexer 190 can be formed, for example, by a frequency converter that subjects broadcast signals for each polarization to frequency conversion into broadcast signals of different frequency bands, and a mixer that mixes these broadcast signals after frequency conversion.

In the illustrated embodiment, the broadcast receiver 240 here can acquire the multiplexed signal, in which the broadcast signals for each polarization have undergone frequency division multiplexing, with a single signal input terminal, and can decode the multiplexed signal into video and audio signals.

With the broadcast signal processing device 103, the above-mentioned multiplexed signal can be transmitted on a single signal cable from the broadcast signal processing device 103 to the broadcast receiver 240. Thus, the connection between the broadcast signal processing device 103 and the broadcast receiver 240 can be simplified. This configuration is effective when simplifying wiring indoors where there is little frequency interference (in particular, wiring near the broadcast receiver 240).

The broadcast signal processing devices are illustrated in accordance with the above-mentioned embodiments. However, the present invention is not limited to or by these individual embodiments. As long as they do not depart from the gist of the present invention, various modifications that a person skilled in the art might think up can be applied to these embodiments, and configurations consisting of combinations of constituent elements from different embodiments can also be included in the scope of one or more aspects of the present invention.

Figure 11:
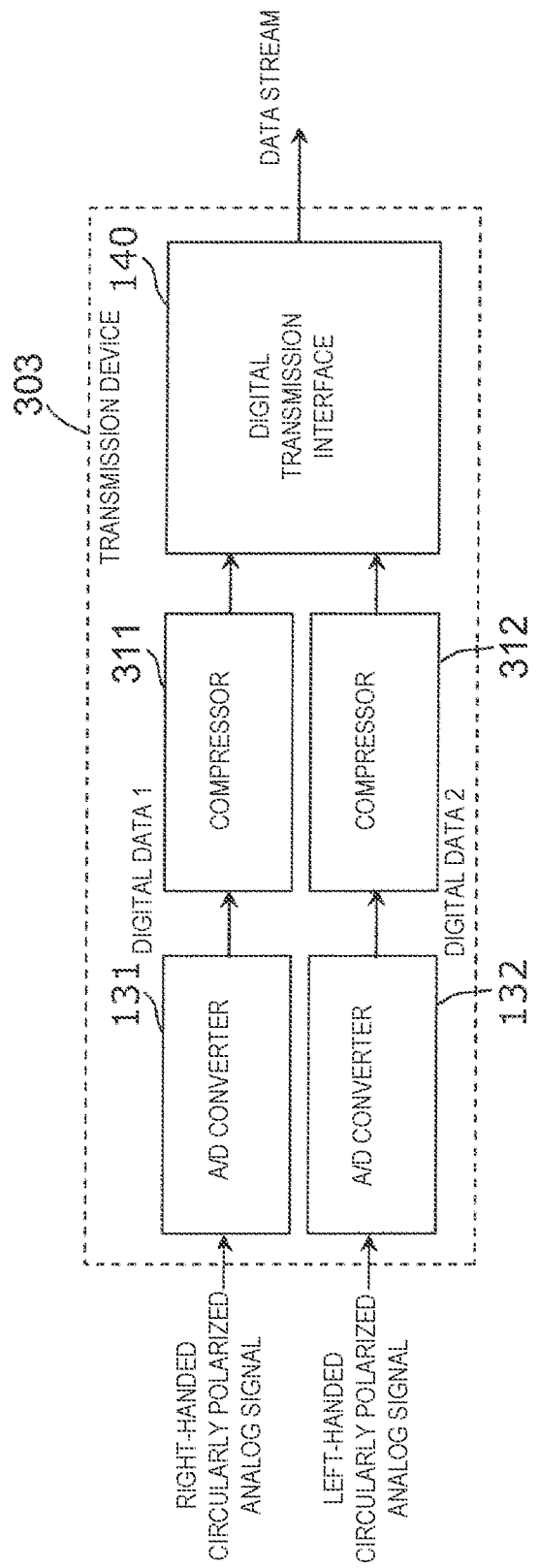
FIG. 11 is a block diagram of an example of a functional configuration of a transmission device of a broadcast signal processing device in accordance with a modified embodiment.

For example, the transmission device in the broadcast signal processing device can include a compressor that compresses a plurality of sets of digital data (e.g., a first digital signal and a second digital signal) after conversion by the A/D converters 131 and 132. Specifically, as shown in FIG. 11, the transmission device 303 can include compressors 311 and 312. The compressors 311 and 312 compress the digital data 1 and 2 (e.g., the first and second digital signals) from the A/D converters 131 and 132, respectively. The compression of the digital signal can be performed by any methods that are well-known in the art. Then, the digital transmission interface 140 (e.g., the generation component) generates the data stream (e.g., the third digital signal) that includes information about the digital data 1 and 2 (e.g., the first and second digital signals) that have been compressed by the compressors 311 and 312. Of course, with this configuration, the reception device can include a decompressor that decompresses the compressed digital data into the digital data 1 and 2.

Also, for example, the transmission device in the broadcast signal processing device can include a lossless compressor for subjecting a plurality of sets of digital data (e.g., a first digital signal and a second digital signal) after conversion by the A/D converters 131 and 132 to lossless compression. In the configuration shown in FIG. 11, the compressors 311 and 312 (e.g., the lossless compressors) can be configured to subject the digital data 1 and 2 (e.g., the first and second digital signals) from the A/D converters 131 and 132 to lossless compression, respectively. In other words, the compressors 311 and 312 losslessly compress the digital data 1 and 2 (e.g., the first and second digital signals), respectively. The lossless compression of the digital signal can be performed by any methods that are well-known in the art. Then, the digital transmission interface 140 (that is, the generation component) generates the data stream (e.g., the third digital signal) that includes information about the digital data 1 and 2 (e.g., the first and second digital signals) that have undergone lossless compression by the compressor 311 and 312. Of course, with this configuration, the reception device can include a decompressor that decompresses the compressed digital data into the digital data 1 and 2.

Here, a known compression method is suitably used for the above-mentioned compression and lossless compression, but there are no particular limitations on the specific compression method.

With this configuration, the first and second digital signals are reduced in size by compression. This affords more efficient transmission. In particular, when lossless compression is used, there is no need to worry about degradation of the first and second digital signals that would occur as a result of compression. Thus, system design can be simplified.

The present invention can be utilized as a broadcast signal processing device, such as a CATV system used in group housing or various other kinds of facility.

[1] In view of the state of the know technology and in accordance with a first aspect, a transmission device comprises a first converter, a second converter, a generation component, and a transmitter. The first converter is configured to convert a first analog signal, which is a broadcast signal of a specific polarity, into a first digital signal. The second converter is configured to convert a second analog signal, which is a broadcast signal whose polarity is different from the specific polarity, into a second digital signal. The generation component is configured to generate a third digital signal that includes information of the first and second digital signals. The transmitter is configured to transmit the third digital signal generated by the generation component.

With this configuration, the first and second analog signals, which are broadcast signals, can be respectively converted into the first and second digital signals and multiplexed as the third digital signal, for example. Then, the third digital signal can be distributed using a single signal cable. Unlike when the first and second analog signals are subjected to frequency division multiplexing while still in the form of analog signals and then distributed with a single signal cable, there is no need to worry about avoiding frequency interference or dealing with image signals that are generated during frequency conversion or mixing. This means that system design is simplified. Also, because disturbance is less likely to have an effect, eliminating disturbance can be easier. As a result, a transmission device can be provided with which analog signals that are broadcast signals with different polarities and that have undergone polarization division multiplexing, for example, can be simply distributed using a single signal cable.

[2] In accordance with a preferred embodiment according to the transmission device mentioned above, the transmission device further comprises a third converter. The third converter is configured to convert frequency of at least one of the first and second analog signals prior to conversion of the at least one of the first and second analog signals by corresponding one of the first and second converters. Thus, for example, the first and second converters can convert analog signals that have undergone frequency conversion by the third converter into digital signals.

With this configuration, for example, even if the frequency of the first or second analog signal is higher than the frequency of analog signals that can be converted by the first or second converter, the first or second analog signal can be converted into a digital signal by down conversion, and the same effect as above can be obtained.

[3] In accordance with a preferred embodiment according to any one of the transmission devices mentioned above, the transmission device further comprises a filter. The filter is configured to pass a specific frequency band of the at least one of the first and second analog signals prior to frequency conversion by the third converter. Thus, for example, the filter can pass an analog signal with the specific frequency band of the first analog signal or the second analog signal, and the third converter can convert the frequency of the analog signal passed by the filter.

With this configuration, for example, even if the frequency bandwidth of the first or second analog signal is wider than the frequency bandwidth of the analog signals that can be converted by the first or second converter, the first or second analog signal can be converted into a digital signal by frequency division, and the same effect as above can be obtained.

[4] In accordance with a preferred embodiment according to any one of the transmission devices mentioned above, the generation component is configured to generate a fourth digital signal that includes information related to at least one of the first digital signal and the second digital signal.

[5] In accordance with a preferred embodiment according to any one of the transmission devices mentioned above, the fourth digital signal include a signal that identifies at least one of the first converter and the second converter as the information related to at least one of the first digital signal and the second digital signal. Thus, the fourth digital signal can include a signal that identifies a converter that has converted an analog signal to the first digital signal or the second digital signal.

[6] In accordance with a preferred embodiment according to any one of the transmission devices mentioned above, the fourth digital signal includes a signal for error correction of at least one of the first digital signal and the second digital signal as the information related to at least one of the first digital signal and the second digital signal. Thus, the fourth digital signal can include a signal for performing error correction on the first digital signal or the second digital signal.

With these configurations, the converter that has converted the first or second analog signal can be distinguished by means of the signal included in the fourth digital signal. Thus, restoring the first or second analog signal is easier. Also, the digital signal can be made more resistant to disturbance by using the above-mentioned signal to perform error correction on the first or second digital signal.

[7] In accordance with a preferred embodiment according to any one of the transmission devices mentioned above, the transmission device further comprises a compressor. The compressor is configured to compress the first and second digital signals. The generation component is configured to generate the third digital signal that includes information about the first and second digital signals that have been compressed.

With this configuration, the first and second digital signals can be reduced in size by compression. This makes more efficient transmission possible.

[8] In accordance with a preferred embodiment according to any one of the transmission devices mentioned above, the transmission device further comprises a lossless compressor. The lossless compressor is configured to subject the first and second digital signals to lossless compression. The generation component is configured to generate the third digital signal that includes information about the first and second digital signals that have undergone the lossless compression.

With this configuration, system design is simplified because there is no need to worry about degradation of the first and second digital signals that would be caused by compression.

[9] In accordance with a preferred embodiment according to any one of the transmission devices mentioned above, the first and second converters are configured to convert time waveforms of the first and second analog signals into the first and second digital signals, respectively.

With this configuration, for example, pulse code modulation or another such known technology can be used to convert the first and second analog signals into the first and second digital signals.

[10] In accordance with a preferred embodiment according to any one of the transmission devices mentioned above, the first and second converters are configured to convert frequency spectrums of the first and second analog signals into the first and second digital signals, respectively.

With this configuration, for example, Fourier transformation or another such known technology can be used to convert the first and second analog signals into the first and second digital signals.

[11] In accordance with a preferred embodiment according to any one of the transmission devices mentioned above, the first and second converters are configured to convert the first and second analog signals into the first and second digital signals at a resolution corresponding to a specific signal-to-noise ratio, respectively.

With this configuration, the frequency bandwidth taken up by the first and second digital signals is kept lower. This reduces level attenuation during transmission and also makes the signals more resistant to disturbance.

[12] In accordance with a preferred embodiment according to any one of the transmission devices mentioned above, the transmission device determines specific signal-to-noise ratio is determined based on broadcast signal type of the first and second analog signals.

[13] In accordance with a preferred embodiment according to any one of the transmission devices mentioned above, the transmission device determines that the specific signal-to-noise ratio is approximately 20 dB.

[14] In view of the state of the know technology and in accordance with a second aspect, a reception device comprises an acquisition component, an extraction component, a first output component, and a second output component. The acquisition component is configured to acquire a digital signal generated based on a first analog signal, which is a broadcast signal with a specific polarity, and a second analog signal, which is a broadcast signal whose polarity is different from the specific polarity. The extraction component is configured to extract from the digital signal a first digital signal generated based on the first analog signal, and a second digital signal generated based on the second analog signal. The first output component is configured to output the first digital signal. The second output component is configured to output the second digital signal.

[15] In accordance with a preferred embodiment according to the reception device mentioned above, the reception device further comprises a first converter, and a second converter. The first converter is configured to convert the first digital signal outputted from the first output component into the first analog signal. The second converter is configured to convert the second digital signal outputted from the second output component into the second analog signal.

With this configuration, the reception device can be provided that is used along with the above-mentioned transmission device and with which the first and second digital signals or the first and second analog signals corresponding to broadcast signals for each polarity are extracted from the third digital signal outputted from the transmission device.

[16] In view of the state of the know technology and in accordance with a third aspect, a broadcast signal processing method comprises converting a first analog signal, which that is a broadcast signal of a specific polarity into a first digital signal (first step), converting a second analog signal, which is a broadcast signal whose polarity is different from the specific polarity, into a second digital signal (second step), combining the first digital signal and the second digital signal as combined digital signal, and transmitting the combined digital signal (third step), receiving the combined digital signals, and extracting the first digital signal and the second digital signal (fourth step), converting the first digital signal that has been extracted into the first analog signal (fifth step), and converting the second digital signal that has been extracted into the second analog signal (sixth step).

With this configuration, the first and second analog signals (broadcast signals) are respectively converted into the first and second digital signals and are multiplexed as the third digital signal. Then, the third digital signal can be distributed using a single signal cable. Unlike when the first and second analog signals are subjected to frequency division multiplexing while still in the form of analog signals and then distributed with a single signal cable, there is no need to worry about avoiding frequency interference or dealing with image signals that are generated during frequency conversion or mixing. This means that system design is simplified. Also, because disturbance is less likely to have an effect, eliminating disturbance can be easier. As a result, a broadcast signal processing method is obtained with which analog signals that are broadcast signals with different polarities and that have undergone polarization division multiplexing, for example, can be simply distributed using a single signal cable.

[17] In view of the state of the know technology and in accordance with a third aspect, a broadcast receiver comprises a first acquisition component, a first converter, a second converter, and a tuner. The first acquisition component is configured to acquire a first digital signal generated based on a first analog signal, which is a broadcast signal with a specific polarity, and a second digital signal generated based on a second analog signal, which is a broadcast signal whose polarity is different from the specific polarity. The first converter is configured to convert the first digital signal into a first analog signal. The second converter is configured to convert the second digital signal into a second analog signal. The tuner is configured to select at least one broadcast signal based on at least one of the first and second analog signals converted by the first and second converters.

[18] In accordance with a preferred embodiment according to the broadcast receiver mentioned above, the broadcast receiver further comprise a second acquisition component, and an extraction component. The second acquisition component is configured to acquire a digital signal generated based on the first and second analog signals. The extraction component is configured to extract the first and second digital signals from the digital signal. The first acquisition component is configured to acquire the first and second digital signals that have been extracted by the extraction component.

With this configuration, the broadcast receiver can be provided that is used along with the above-mentioned transmission device and with which the first and second digital signals or the first and second analog signals corresponding to broadcast signals for each polarity are extracted from the third digital signal outputted from the transmission device.

[19] In accordance with a preferred embodiment according to any one of the transmission devices mentioned above, the generation component is configured to generate the third digital signal as a single data stream by multiplexing the first and second digital signals.

[20] In accordance with a preferred embodiment according to any one of the transmission devices mentioned above, the generation component is configured to generate the third and fourth digital signals as a single data stream by multiplexing the information of the first and second digital signals and the information related to at least one of the first digital signal and the second digital signal.

With the transmission device and the broadcast signal processing method of the present disclosure, the first and second analog signals (broadcast signals) are respectively converted into the first and second digital signals and multiplexed as the third digital signal. Then, the third digital signal can be distributed with a single signal cable. Unlike when the first and second analog signals are subjected to frequency division multiplexing while still in the form of analog signals and then distributed with a single signal cable, there is no need to worry about avoiding frequency interference or dealing with image signals that are generated during frequency conversion or mixing. This means that system design is simplified. Also, because disturbance is less likely to have an effect, eliminating disturbance can be easier. As a result, a transmission device and a broadcast signal processing method can be provided with which analog signals that are broadcast signals with different polarities and that have undergone polarization division multiplexing, for example, can be simply distributed using a single signal cable.

Also, with the reception device and the broadcast receiver of the present disclosure, a reception device can be provided that is used along with the above-mentioned transmission device and with which the first and second digital signals or the first and second analog signals corresponding to broadcast signals for each polarity are extracted from the third digital signal outputted from the transmission device, and a broadcast receiver can be provided with which tuning is further performed.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A transmission device comprising:
   a first converter that converts a first analog signal, which is a broadcast signal of a specific polarity, into a first digital signal;
   a second converter that converts a second analog signal, which is a broadcast signal whose polarity is different from the specific polarity, into a second digital signal;
   a generator that generates a third digital signal that includes information of the first and second digital signals; and
   a transmitter that transmits the third digital signal generated by the generator,
   the generator generating a fourth digital signal that includes information related to at least one of the first digital signal and the second digital signal,
   the fourth digital signal including a signal that identifies at least one of the first converter and the second converter as the information related to at least one of the first digital signal and the second digital signal.

2. The transmission device according to claim 1, further comprising
   a third converter that converts frequency of at least one of the first and second analog signals prior to conversion of the at least one of the first and second analog signals by corresponding one of the first and second converters.

3. The transmission device according to claim 2, further comprising
   a filter that passes a specific frequency band of the at least one of the first and second analog signals prior to frequency conversion by the third converter.

4. The transmission device according to claim 1, wherein
   the fourth digital signal includes a signal for error correction of at least one of the first digital signal and the second digital signal as the information related to at least one of the first digital signal and the second digital signal.

5. The transmission device according to claim 1, further comprising
   a compressor that compresses the first and second digital signals,
   the generator generating the third digital signal that includes information about the first and second digital signals that have been compressed.

6. The transmission device according to claim 1, further comprising a lossless compressor that subjects the first and second digital signals to lossless compression,
   the generator generating the third digital signal that includes information about the first and second digital signals that have undergone the lossless compression.

7. The transmission device according to claim 1, wherein the first and second converters convert time waveforms of the first and second analog signals into the first and second digital signals, respectively.

8. The transmission device according to claim 1, wherein the first and second converters convert frequency spectrums of the first and second analog signals into the first and second digital signals, respectively.

9. The transmission device according to claim 1, wherein the first and second converters convert the first and second analog signals into the first and second digital signals at a resolution corresponding to a specific signal-to-noise ratio, respectively.

10. The transmission device according to claim 9, wherein the transmission device determines the specific signal-to-noise ratio based on broadcast signal type of the first and second analog signals.

11. The transmission device according to claim 9, wherein the transmission device determines that the specific signal-to-noise ratio is approximately 20 dB.

12. The transmission device according to claim 1, wherein the generator generates the third digital signal as a single data stream by multiplexing the first and second digital signals.

13. The transmission device according to claim 1, wherein the generator generates the third and fourth digital signals as a single data stream by multiplexing the information of the first and second digital signals and the information related to at least one of the first digital signal and the second digital signal.

14. A reception device comprising
   a digital reception interface
      that acquires a digital signal generated based on a first analog signal, which is a broadcast signal with a specific polarity, and a second analog signal, which is a broadcast signal whose polarity is different from the specific polarity,
      that extracts from the digital signal a first digital signal generated based on the first analog signal, and a second digital signal generated based on the second analog signal, and
      that outputs the first digital signal and the second digital signal.,
   a first converter that converts the first digital signal outputted from the digital reception interface into the first analog signal; and
   a second converter that converts the second digital signal outputted from the digital reception interface into the second analog signal.

15. A broadcast signal processing method comprising:
   converting a first analog signal, which is a broadcast signal of a specific polarity, into a first digital signal;
   converting a second analog signal, which is a broadcast signal whose polarity is different from the specific polarity, into a second digital signal;
   combining the first digital signal and the second digital signal as combined digital signal, and transmitting the combined digital signal;
   acquiring the combined digital signal, extracting from the combined digital signal the first digital signal and the second digital signal, and outputting the first digital signal and the second digital signal;

converting the first digital signal that has been outputted into the first analog signal; and converting the second digital signal that has been outputted into the second analog signal.

16. A broadcast receiver comprising a digital reception interface
- that acquires a digital signal generated based on a first analog signal, which is a broadcast signal with a specific polarity, and a second analog signal, which is a broadcast signal whose polarity is different from the specific polarity, and
- that extracts from the digital signal a first digital signal generated based on the first analog signal, and a second digital signal generated based on the second analog signal;

first and second signal input terminals that acquire the first and second digital signals that have been extracted by the digital reception interface, respectively;

a first converter that converts the first digital signal that have been acquired by the first signal input terminal into a first analog signal;

a second converter that converts the second digital signal that have been acquired by the second signal input terminal into a second analog signal;

a tuner that selects at least one broadcast signal based on at least one of the first and second analog signals converted by the first and second converters.

\* \* \* \* \*